(12) United States Patent
Son et al.

(10) Patent No.: US 10,860,274 B2
(45) Date of Patent: Dec. 8, 2020

(54) ELECTRONIC DEVICE HAVING TWO DISPLAY DEVICES AND METHOD OF OPERATING SCREEN THEREOF

(71) Applicant: Samsung Electronics Co., Ltd., Gyeonggi-do (KR)

(72) Inventors: Hyunkeun Son, Seoul (KR); Jangwoon Kim, Seoul (KR); Chungha Kim, Seoul (KR); Jaeho Baik, Gyeonggi-do (KR); Junwon Lee, Gyeonggi-do (KR); Seungho Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 204 days.

(21) Appl. No.: 16/022,100

(22) Filed: Jun. 28, 2018

(65) Prior Publication Data
US 2019/0004764 A1 Jan. 3, 2019

(30) Foreign Application Priority Data
Jun. 28, 2017 (KR) .......................... 10-2017-0081956

(51) Int. Cl.
*G06F 3/14* (2006.01)
*G06F 1/16* (2006.01)
(Continued)

(52) U.S. Cl.
CPC .......... *G06F 3/1446* (2013.01); *G06F 1/1601* (2013.01); *G06F 1/1616* (2013.01); *G06F 1/1647* (2013.01); *G06F 1/1654* (2013.01); *G06F 1/1681* (2013.01); *G06F 3/147* (2013.01); *G06F 3/1423* (2013.01); *G06F 3/04883* (2013.01); *G09G 2300/026* (2013.01)

(58) Field of Classification Search
CPC ............................ G06F 1/1601; G06F 3/1446
See application file for complete search history.

(56) References Cited

U.S. PATENT DOCUMENTS

| 9,582,047 B2 | 2/2017 | Yeh et al. | |
| 2006/0062625 A1* | 3/2006 | Lian ...................... | G06F 3/0221 |
| | | | 400/489 |

(Continued)

FOREIGN PATENT DOCUMENTS

KR 10-0501132 7/2005

*Primary Examiner* — William Boddie
*Assistant Examiner* — Andrew B Schnirel
(74) *Attorney, Agent, or Firm* — The Farrell Law Firm, P.C.

(57) ABSTRACT

A method and an electronic device are provided, which attach or detaches two displays by magnetism. The electronic device includes a first housing including a first display exposed through a surface of the first housing, and a first cylindrical magnet disposed in a side of the first housing; and a second housing including a second display exposed through a surface of the second housing, and a second cylindrical magnet disposed in a side end of the second housing. At least one of the first cylindrical magnet and second cylindrical magnet is configured to rotate within the first housing and the second housing, respectively, by magnetic attraction of the first cylindrical magnet and second cylindrical magnet being adjacent to each other. The first housing and the second housing are coupled to each other by the magnetic attraction of the first cylindrical magnet and the second cylindrical magnet.

18 Claims, 21 Drawing Sheets

(51) Int. Cl.
*G06F 3/147* (2006.01)
*G06F 3/0488* (2013.01)

(56) References Cited

U.S. PATENT DOCUMENTS

| | | | |
|---|---|---|---|
| 2010/0238620 A1* | 9/2010 | Fish | G06F 1/1616 361/679.09 |
| 2013/0162668 A1* | 6/2013 | Lauder | G06F 1/1626 345/619 |
| 2013/0242495 A1* | 9/2013 | Bathiche | H01R 11/30 361/679.28 |
| 2015/0241925 A1* | 8/2015 | Seo | G06F 1/1652 361/679.27 |
| 2015/0268699 A1* | 9/2015 | Bathiche | G06F 1/1654 345/1.3 |
| 2015/0379964 A1* | 12/2015 | Lee | G06F 3/0412 345/173 |
| 2016/0098064 A1* | 4/2016 | Becze | G06G 1/00 361/679.3 |
| 2016/0226182 A1* | 8/2016 | Szeto | H01R 11/30 |
| 2016/0268729 A1 | 9/2016 | Szeto | |
| 2017/0077458 A1 | 3/2017 | Jia et al. | |
| 2017/0078798 A1 | 3/2017 | Palmer et al. | |
| 2018/0198308 A1* | 7/2018 | Files | H02J 50/40 |
| 2018/0203658 A1* | 7/2018 | Files | G06F 1/1681 |

\* cited by examiner

ELECTRONIC DEVICE HAVING TWO DISPLAY DEVICES AND METHOD OF OPERATING SCREEN THEREOF

CROSS-REFERENCE TO RELATED APPLICATION(S)

This application is based on and claims priority under 35 U.S.C. § 119(a) to Korean Patent Application No. 10-2017-0081956, filed on Jun. 28, 2017, in the Korean Intellectual Property Office, the disclosure of which is incorporated by reference herein in its entirety.

BACKGROUND

1. Field

The present disclosure relates generally to an electronic device that attaches or detaches two displays by magnetism and a method of operating a screen thereof.

2. Description of Related Art

Displays are provided in small portable electronic devices as well as in large electronic devices. Generally, a size of a display of an electronic device is restricted by a size of the electronic device. However, with the development of communication and electronic technology, newer trends and/or user needs variously change, and with these changes, displays have evolved in various forms, and various technology developments that extend the display or that enhances use of the display are required.

SUMMARY

The present disclosure is designed to address at least the problems and/or disadvantages described above and to provide at least the advantages described below.

Accordingly, an aspect of the present disclosure is to provide an electronic device that separates into two displays and has a coupling form of various angles, by magnetism, without an external hinge structure. The electronic device may control one or both of two displays to simultaneously output a screen according to the coupling form of two display devices.

In accordance with an aspect of the present disclosure, an electronic device is provided, which includes a first housing including a plurality of surfaces; a first display exposed through one surface of the first housing; a first wireless communication module disposed within the first housing; at least one first cylindrical magnet disposed in at least one end of the first housing and configured to rotate a shaft by attraction of an adjacent magnet; a second housing physically separated from the first housing and including a plurality of surfaces; a second display exposed through one surface of the second housing; a second wireless communication module disposed within the second housing and configured to perform wireless communication with the first wireless communication module; at least one second cylindrical magnet disposed in at least one end of the second housing and configured to rotate a shaft by attraction of an adjacent magnet; at least one processor disposed in at least one of the first housing and the second housing; and a memory connected to the at least one processor, wherein, when executed, the memory stores instructions that enable the processor to determine a coupling form in which the first housing and the second housing are attached by magnetic attraction of the first cylindrical magnet and the second cylindrical magnet; to select at least one display to display a screen among the first display and the second display according to a coupling form of the first housing and the second housing in response to a screen display request of the display; and to control to output individually or simultaneously a screen in the first display and the second display based on a screen configuration to display in the selected display.

BRIEF DESCRIPTION OF THE DRAWINGS

The objects, features, and advantages of certain embodiments of the present disclosure will be more apparent from the following detailed description in conjunction with the accompanying drawings, in which.

DETAILED DESCRIPTION OF EMBODIMENTS

Figure 1:
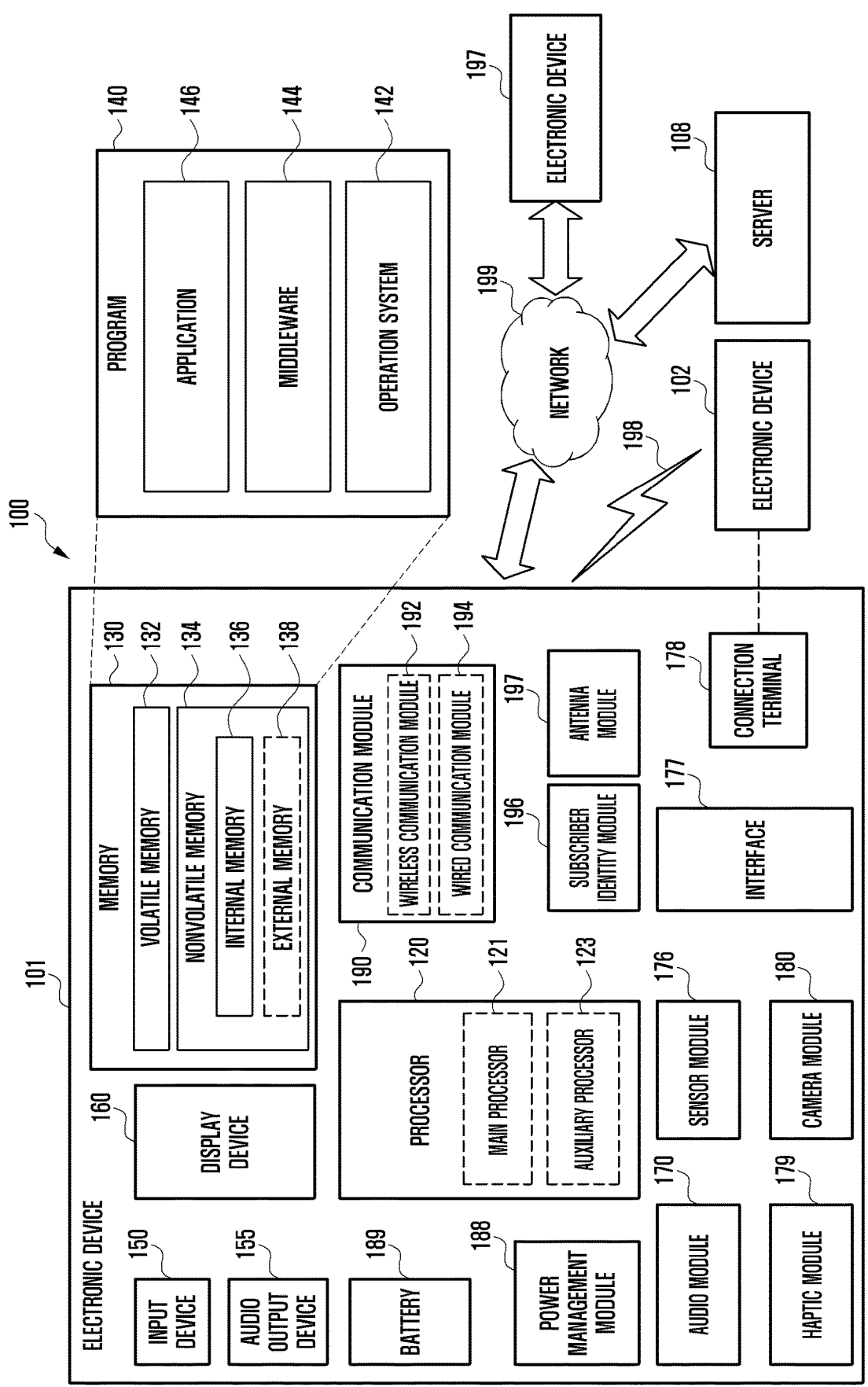
FIG. 1 illustrates an electronic device in a network environment according to an embodiment.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The various embodiments and the terms used herein are not intended to limit the technological features set forth herein to particular embodiments and include various changes, equivalents, or replacements for a corresponding embodiment. With regard to the description of the drawings, similar reference numerals may be used to refer to similar or related elements.

A singular form of a noun corresponding to an item may include one or more of the things, unless the relevant context clearly indicates otherwise.

Further, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

Numerical terms, such as "$1^{st}$," "$2^{nd}$," "first," and "second" may be used to distinguish a corresponding component from another, but do not limit the components in other aspects (e.g., importance or order). Further, if a first element is referred to as being "coupled with," "coupled to," "connected with," or "connected to" a second element, the first element may be coupled with the second element directly (e.g., wiredly), wirelessly, or via a third element.

Herein, the term "module" may include a unit implemented in hardware, software, or firmware, and may interchangeably be used with other terms, e.g., "logic," "logic block," "part," or "circuitry". A module may be a single integral component, or a minimum unit or part thereof, adapted to perform one or more functions. For example, a module may be implemented as an application-specific integrated circuit (ASIC).

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108.

The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. Alternatively, at least one of the components (e.g., the display device 160 or the camera module 180) may be omitted from the electronic device 101, or one or more other components may be added in the electronic device 101. Further, some of the components in the electronic device 101 may be implemented as single integrated circuitry (IC). For example, the sensor module 176 (e.g., a fingerprint sensor, an iris sensor, or an illuminance sensor) may be implemented as an embedded component in the display device 160.

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134.

The processor 120 includes a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121.

Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 may be implemented as part of another component (e.g., the camera module 180 or the communication module 190) functionally related to the auxiliary processor 123.

The memory 130 may store various data used by at least one component of the electronic device 101. The various data may include software (e.g., the program 140) and input data or output data for a command related thereto. The memory 130 includes the volatile memory 132 and the non-volatile memory 134.

The program 140 may be stored in the memory 130 as software, and may include, e.g., an operating system (OS) 142, middleware 144, and an application 146.

The input device 150 may receive a command or data to be used by other component of the electronic device 101, from the outside (e.g., a user) of the electronic device 101. The input device 150 may include a microphone, a mouse, a keyboard, etc.

The audio output device 155 may output sound signals to the outside of the electronic device 101. The audio output device 155 may include a speaker or a receiver. The speaker may be used for general purposes, such as playing multimedia or playing a record, and the receiver may be used for incoming calls. Alternatively, the receiver may be implemented as separate device, or as part of the speaker.

The display device 160 may visually provide information to the outside of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or headphones of an external electronic device 102 directly (e.g., wiredly) or wirelessly coupled with the electronic device 101. The sensor module 176 may detect an operational state (e.g., power or temperature) of the electronic device 101 or an environmental state (e.g., a state of a user) external to the electronic device 101, and generate an electrical signal or data value corresponding to the detected state. For example, the sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 177 may support one or more specified protocols to be used for the electronic device 101 to be coupled with the external electronic device 102 directly (e.g., wiredly) or wirelessly. The interface 177 may include a high definition multimedia interface (HDMI), a universal serial bus (USB) interface, a secure digital (SD) card interface, and/or an audio interface.

A connecting terminal 178 may include a connector via which the electronic device 101 may be physically connected with the external electronic device 102. The connecting terminal 178 may include an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus that may be recognized by a user via tactile sensation or kinesthetic sensation. The haptic module 179 may include a motor, a piezoelectric element, and/or an electric stimulator.

The camera module 180 may capture a still image or moving images. The camera module 180 may include one or more lenses, image sensors, image signal processors, and/or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell, which is not rechargeable, a secondary cell, which is rechargeable, and/or a fuel cell.

The communication module 190 may support establishing a direct (e.g., wired) communication channel or a wireless communication channel between the electronic device 101 and the electronic device 102, the electronic device 104, and/or the server 108, and may support performing communication via the established communication channel. The communication module 190 may include one or more communication processors that are operable independently from the processor 120 (e.g., an AP) and supports a direct (e.g., wired) communication or a wireless communication. The communication module 190 includes a wireless communication module 192 (e.g., a cellular communication module, a short-range wireless communication module, and/or a global navigation satellite system (GNSS) communication module) and a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or according to an Infrared Data Association (IrDA) standard) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the SIM 196.

The antenna module 197 may transmit or receive a signal or power to or from the outside (e.g., the external electronic device) of the electronic device 101. The antenna module 197 may include one or more antennas, and, therefrom, at least one antenna appropriate for a communication scheme used in the communication network, such as the first network 198 or the second network 199, may be selected by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), and/or mobile industry processor interface (MIPI)).

Commands or data may be transmitted and received between the electronic device 101 and the external electronic device 104 via the server 108 coupled with the second network 199. Each of the electronic devices 102 and 104 may be a same type of device as, or a different type of device from, the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. For example, cloud computing, distributed computing, or client-server computing technology may be used.

An electronic device according to an embodiment may be one of various types of electronic devices. For example, the electronic devices may include a portable communication device (e.g., a smart phone), a computer device, a portable multimedia device, a portable medical device, a camera, a wearable device, or a home appliance, but is not limited thereto.

Figure 2:
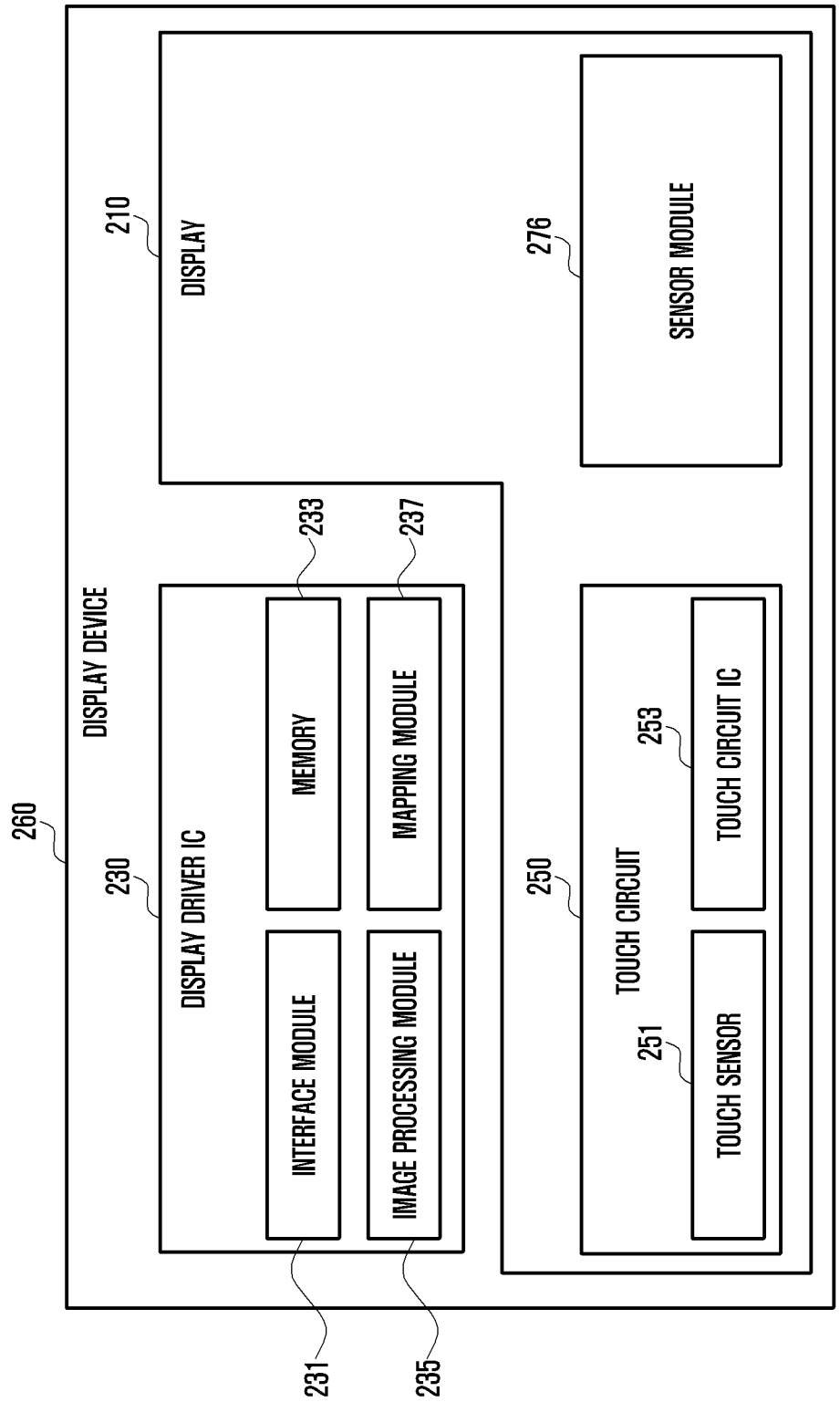
FIG. 2 illustrates a display device according to an embodiment.

FIG. 2 illustrates a display device according to an embodiment.

Referring to FIG. 2, a display device 260 includes a display 210 and a display driver integrated circuit (DDIC) 230 to control the display 210. The DDIC 230 includes an interface module 231, a memory 233 (e.g., a buffer memory), an image processing module 235, and a mapping module 237. The DDIC 230 may receive image information including image data or an image control signal corresponding to a command to control the image data from another component of the electronic device 101 via the interface module 231. For example, the image information may be received from a processor (e.g., the main processor 121 (e.g., an application processor) or the auxiliary processor 123 (e.g., a graphics processing unit) operated independently from the function of the main processor 121 as illustrated in FIG. 1). The DDIC 230 may communicate with touch circuitry 250 or the sensor module 276 via the interface module 231. The DDIC 230 may also store at least part of the received image information in the memory 233, e.g., on a frame by frame basis.

The image processing module 235 may perform pre-processing or post-processing (e.g., adjustment of resolution, brightness, or size) with respect to at least part of the image data. The pre-processing or post-processing may be performed based at least in part on one or more characteristics of the image data or one or more characteristics of the display 210.

The mapping module 237 may generate a voltage value or a current value corresponding to the image data pre-processed or post-processed by the image processing module 235. The generating of the voltage value or current value may be performed based at least in part on one or more attributes of the pixels (e.g., an array, such as a red, green, blue (RGB) stripe or a pentile structure, of the pixels, or the size of each subpixel). At least some pixels of the display 210 may be driven, based at least in part on the voltage value or the current value, such that visual information (e.g., a text, an image, or an icon) corresponding to the image data may be displayed via the display 210.

The display device 260 further includes the touch circuitry 250. The touch circuitry 250 includes a touch sensor 251 and a touch sensor IC 253 to control the touch sensor 251. The touch sensor IC 253 may control the touch sensor 251 to sense a touch input or a hovering input with respect to a certain position on the display 210. For example, the touch sensor 251 may detect or measure a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. At least part (e.g., the touch sensor IC 253) of the touch circuitry 250 may be formed as part of the display 210 or the DDIC 230, or as part of another component (e.g., the auxiliary processor 123) disposed outside the display device 260.

The display device 260 may further include at least one sensor (e.g., a fingerprint sensor, an iris sensor, a pressure sensor, or an illuminance sensor) of the sensor module 276 or a control circuit for the at least one sensor. The at least one sensor or the control circuit for the at least one sensor may be embedded in one portion of a component (e.g., the display 210, the DDIC 230, or the touch circuitry 250)) of the display device 260.

For example, when the sensor module 276 embedded in the display device 260 includes a biometric sensor (e.g., a fingerprint sensor), the biometric sensor may obtain biometric information (e.g., a fingerprint image) corresponding to a touch input received via a portion of the display 210. As another example, when the sensor module 276 embedded in the display device 260 includes a pressure sensor, the pressure sensor may obtain pressure information corresponding to a touch input received via a partial or whole area of the display 210. The touch sensor 251 or the sensor module 276 may be disposed between pixels in a pixel layer of the display 210, or over or under the pixel layer.

FIGS. 3A to 3F illustrate a magnetic coupling structure of two display devices according to an embodiment.

Referring to FIG. 3, an electronic device includes a first electronic device 101 or a first housing 301 and a second electronic device or a second housing 302, which separates from the first housing 301. The second housing 302 may or may not have the same configuration as the first housing 301. The first housing 301 and the second housing 302 may each be individual electronic devices that can perform wireless communication and that can operate independently, but may also be form a single electronic device, wherein two displays are configured with a single set.

The first housing 301 includes a first display 361 having a full screen structure at a front surface and a first cylindrical magnet 310 configured to change, via rotation, positions of an N pole and an S pole by magnetism in at least one end of the first housing 301. The second housing 302 includes a second display 362 having a full screen structure at a front surface and a second cylindrical magnet 312 configured to rotate for magnetic coupling to the first cylindrical magnet 310 included in the first housing 301 in at least one end of the second housing 302.

The first housing 301 may include a fixing portion configured to support the first cylindrical magnet 310 and to rotate for a shaft change of an N pole and an S pole in response to magnetism of an adjacent magnet. The second housing 302 may also include a fixing portion configured to support the second cylindrical magnet 312 and to rotate for a shaft change of an N pole and an S pole in response to magnetism with an adjacent magnet (e.g., the first cylindrical magnet 310 within the first housing 301).

When each side surface of the first housing 301 and the second housing 302 that mounts the first cylindrical magnet 310 and the second cylindrical magnet 312 is adjacent and within a predetermined distance of each other, magnetic attraction increases, and thus, the first housing 301 and the second housing 302 may connect through magnetism. For example, when the first housing 301 and the second housing 302 are adjacent, an N pole of the first cylindrical magnet 310 and an S pole of the second cylindrical magnet 312 may rotate accordingly to be in opposite orientation by magnetic attraction, and as the polarities of two cylindrical magnets 310 and 312 are adjusted, the first housing 301 and the second housing 302 may contact and maintain a coupled form.

In order to separate the first housing 301 and the second housing 302, when the user applies a force that is relatively larger than a magnetic force between the first cylindrical magnet 310 and the second cylindrical magnet 312, in an opposite direction of a magnetic direction, the first housing 301 and the second housing 302 may be separated from each other.

In order to maintain a coupled form in different orientations of FIGS. 3A to 3F, the first housing 301 and the second housing 302 further include holder magnets 311 and 313 at the other side end from which the cylindrical magnets 310 and 312 are disposed. For example, the holder magnets 311 and 313 are disposed at the corners of the other side edges in which the cylindrical magnets 310 and 312 are not disposed. The holder magnets 311 and 313 increase a coupling force of a holding form of the first housing 301 and the second housing 302 and may have a single pole. For example, the holder magnet 311 installed in the first housing 301 and the holder magnet 313 installed in the second housing 302 may have a structure in which a front surface and a rear surface have an opposite pole at an opposite position.

Figure 3A:
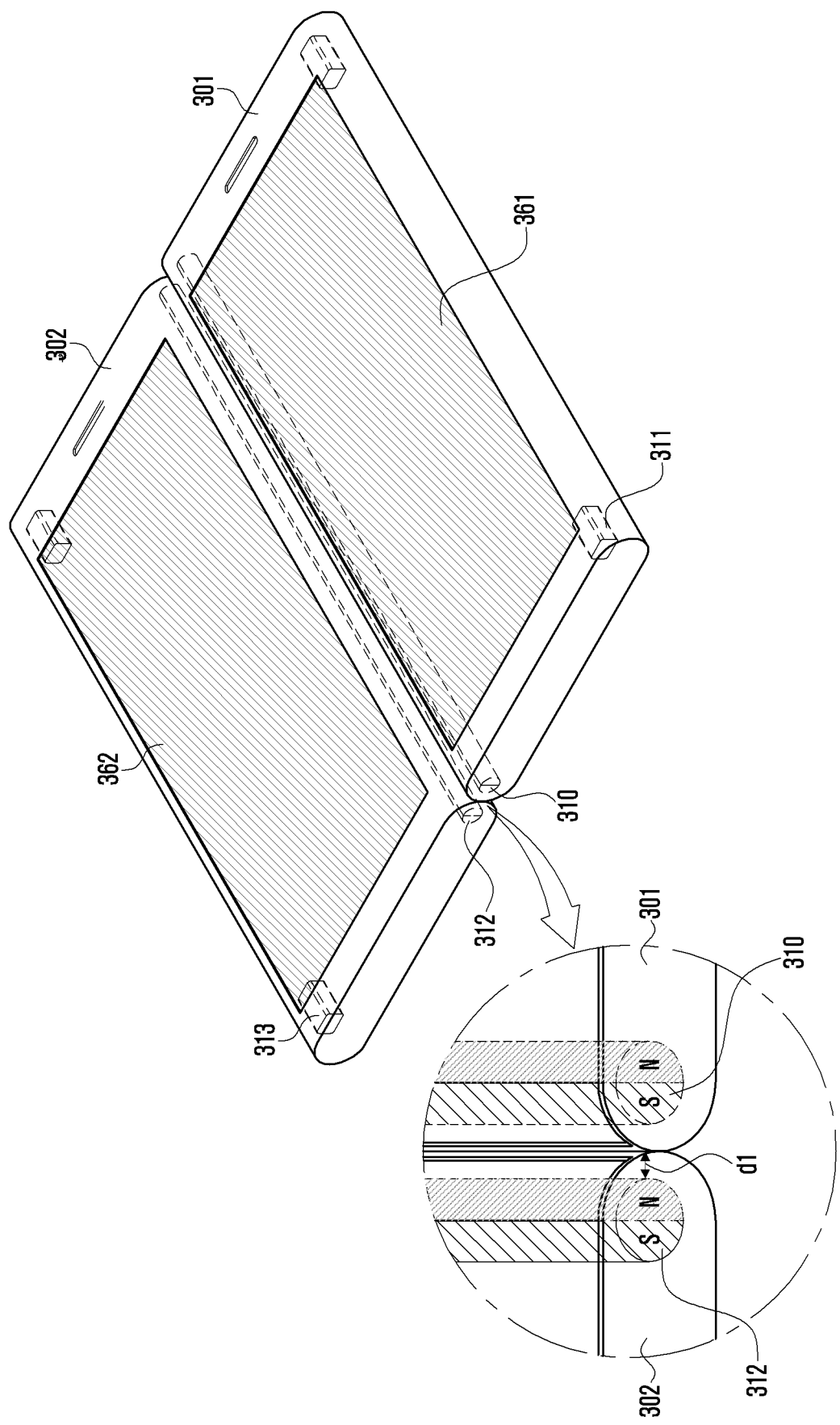
FIGS. 3A to 3F illustrate a magnetic coupling structure of two display devices according to an embodiment.
Figure 3B:
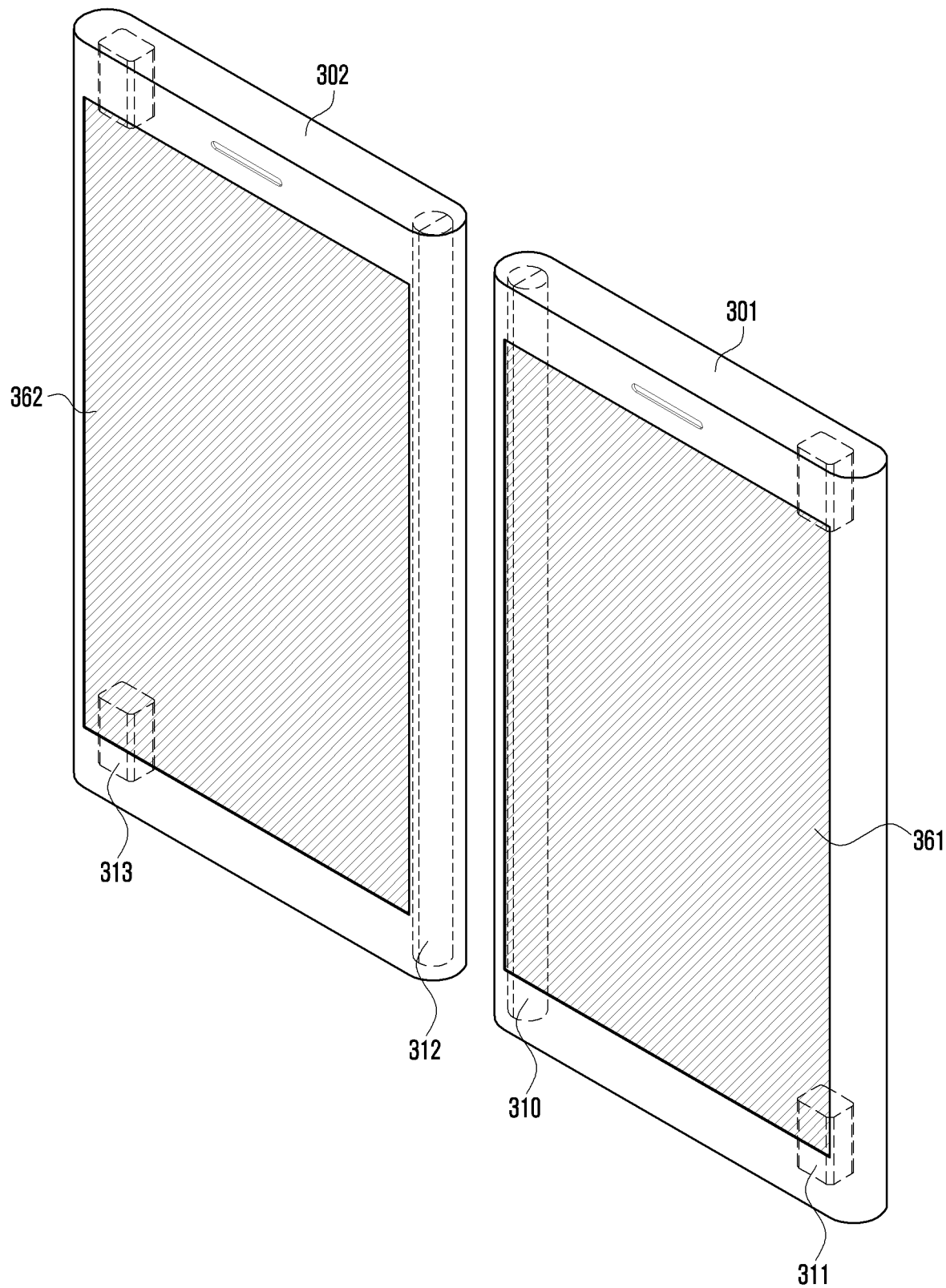
Figure 3C:
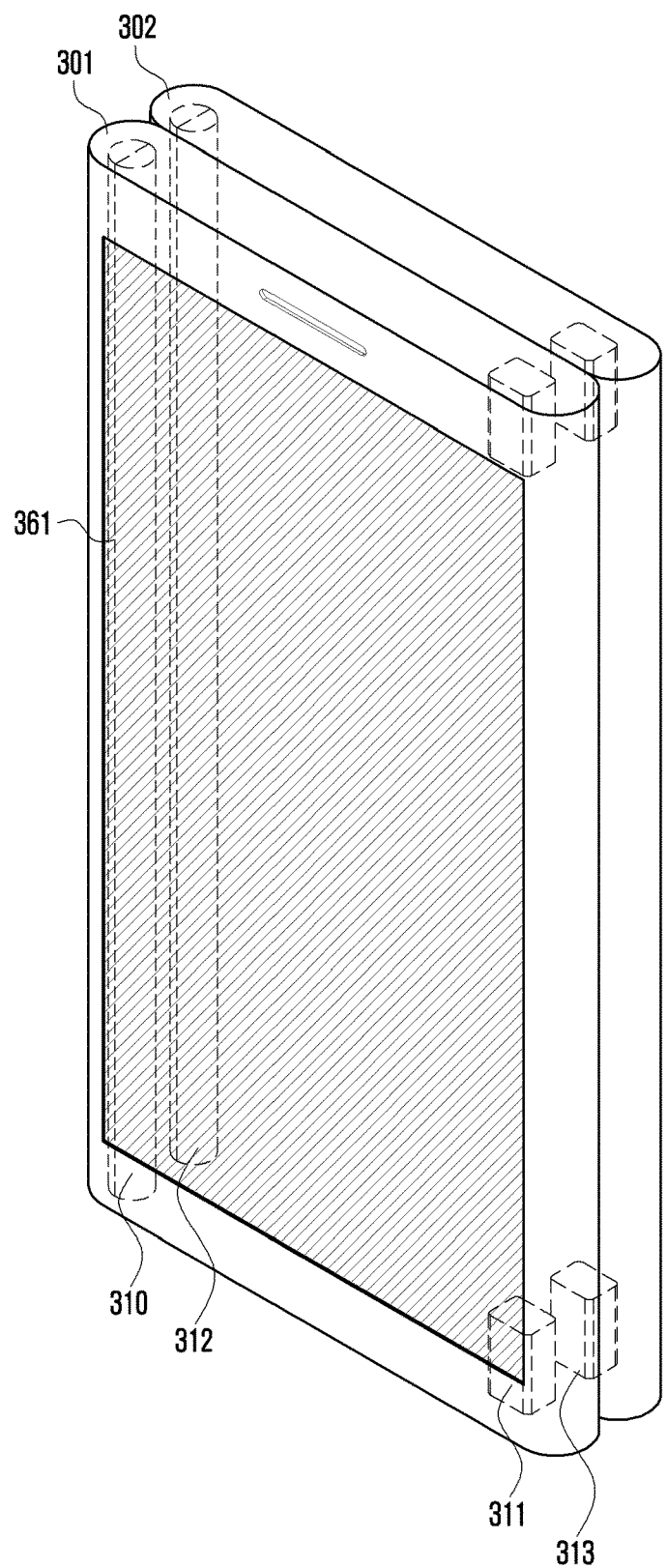
Figure 3D:
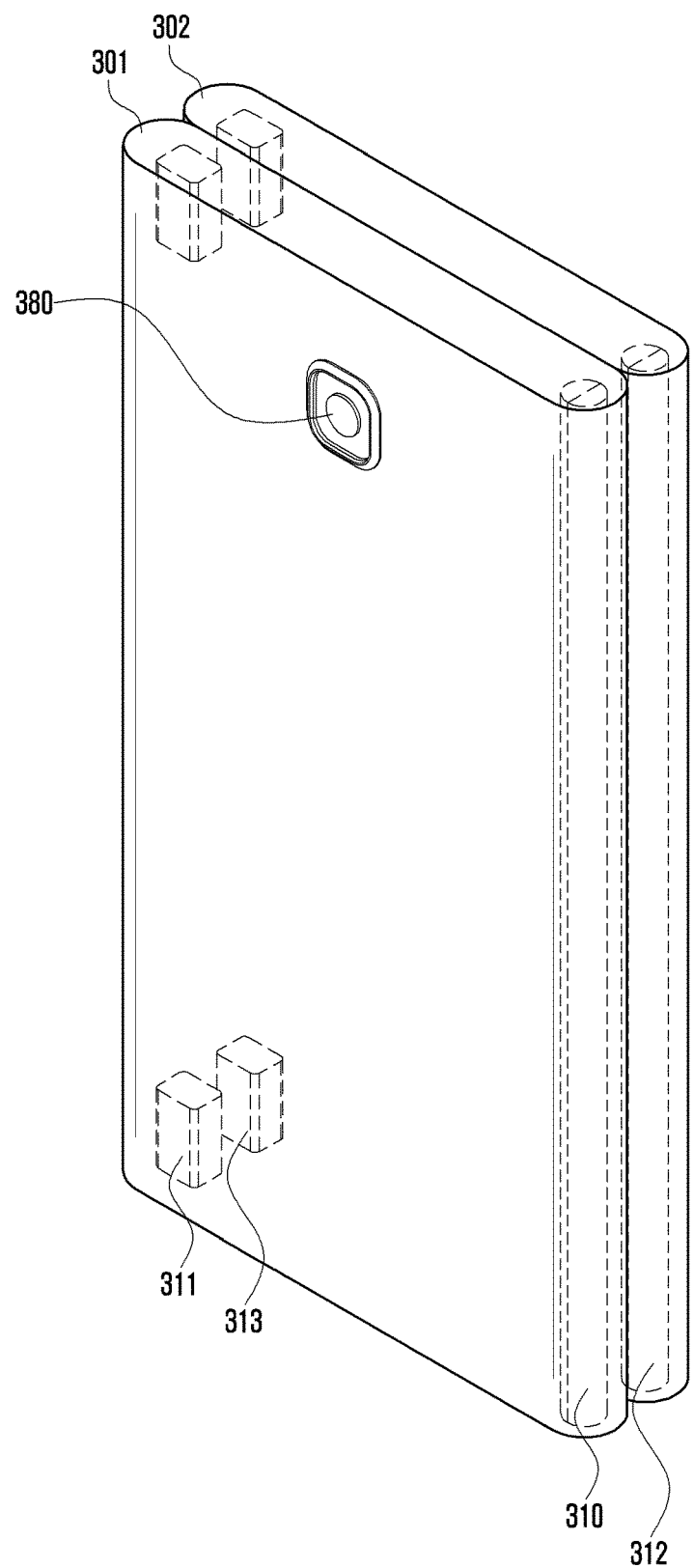
Figure 3E:
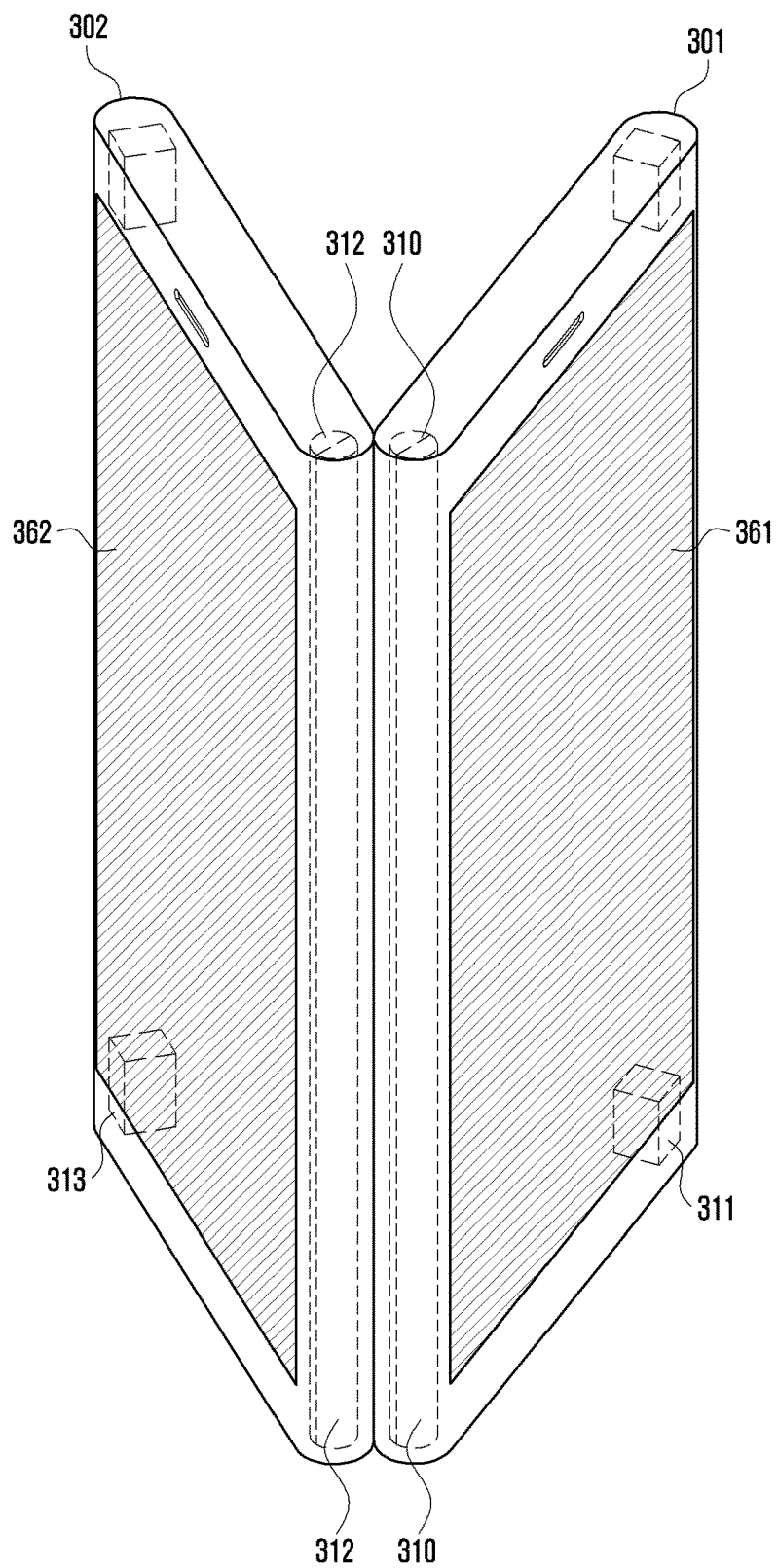

The first housing 301 and the second housing 302 may be magnetically coupled in a form having a predetermined angle, as illustrated in FIG. 3E. For example, when a magnetic coupling angle between the first housing 301 and the second housing 302 is changed by a physical force, the first cylindrical magnet 310 and the second cylindrical magnet 312 may rotate within the first housing 301 and the second housing 302, respectively, to rotate to a position in which opposite polarities maintain maximum attraction. When positions of the S pole and the N pole of the first cylindrical magnet 310 and the second cylindrical magnet 312 rotate, the first housing 301 and the second housing 302 may be magnetically coupled while maintaining a form having a predetermined angle.

As illustrated in FIG. 3A, the first housing 301 and the second housing 302 may be magnetically coupled at respective side surfaces in a form in which the first display 361 and the second display 362 face the same direction, e.g., upwards.

Alternatively, the first housing 301 and the second housing 302 may be magnetically coupled at respective side surfaces in a form in which the first display 361 and the second display 362 face different directions, e.g., the first housing 301 and the second housing 302 may be magnetically coupled such that the second display 362 faces downward when the first display 361 faces upward.

The first cylindrical magnet 310 and the second cylindrical magnet 312 each may be a cylinder that can rotate about a single shaft at one side end of at least one of the first and second housings 301 and 302 and may be disposed within a predetermined distance dl from the outside (e.g., the housing) of the housings 301 and 302. Because the cylindrical magnets 310 and 312 are disposed within a predetermined distance dl, attraction by magnetic coupling between the first housing 301 and the second housing 302 may increase, and by maintaining magnetic attraction, a coupling form of the first housing 301 and the second housing 302 may be variously implemented.

When the first housing 301 and the second housing 302 are magnetically coupled and a force relatively larger than magnetic attraction between the first cylindrical magnet 310 and the second cylindrical magnet 312 is applied in an opposite direction, the first housing 301 and the second housing 302 may be separated from each other, as illustrated in FIG. 3B.

Referring to FIG. 3C, the first housing 301 and the second housing 302 may be magnetically coupled in an out-folding form in which the first display 361 and the second display 362 are opposite to each other in an outward direction to both be exposed. For example, the first display 361 is visible on the front surface of the coupled devices and the second display 362 is visible on the rear surface of the coupled devices.

Referring to FIG. 3D, the first housing 301 and the second housing 302 may be attached in an in-folding form in which both the first display 361 and the second display 362 face an inward direction. As illustrated in FIG. 3D, in the in-folding form in which each display is opposite in an inward direction, because the first display 361 and the second display 362 are positioned within the folded housings, the first display 361 and the second display 362 can be protected from an outside environment.

Referring to FIG. 3E, the first display 361 and the second display 362 are exposed in an outward direction, and the first housing 301 and the second housing 302 are magnetically coupled in a coupling angle of 90° or less. In the coupled form of FIG. 3E, because the first housing 301 and the second housing 302 may be supported while maintaining a form having a predetermined angle with a rotation of positions of the S pole and the N pole of the first cylindrical magnet 310 and the second cylindrical magnet 312, the first housing 301 and the second housing 302 may stand on a surface, e.g., a table top, without a separate support.

Figure 3F:
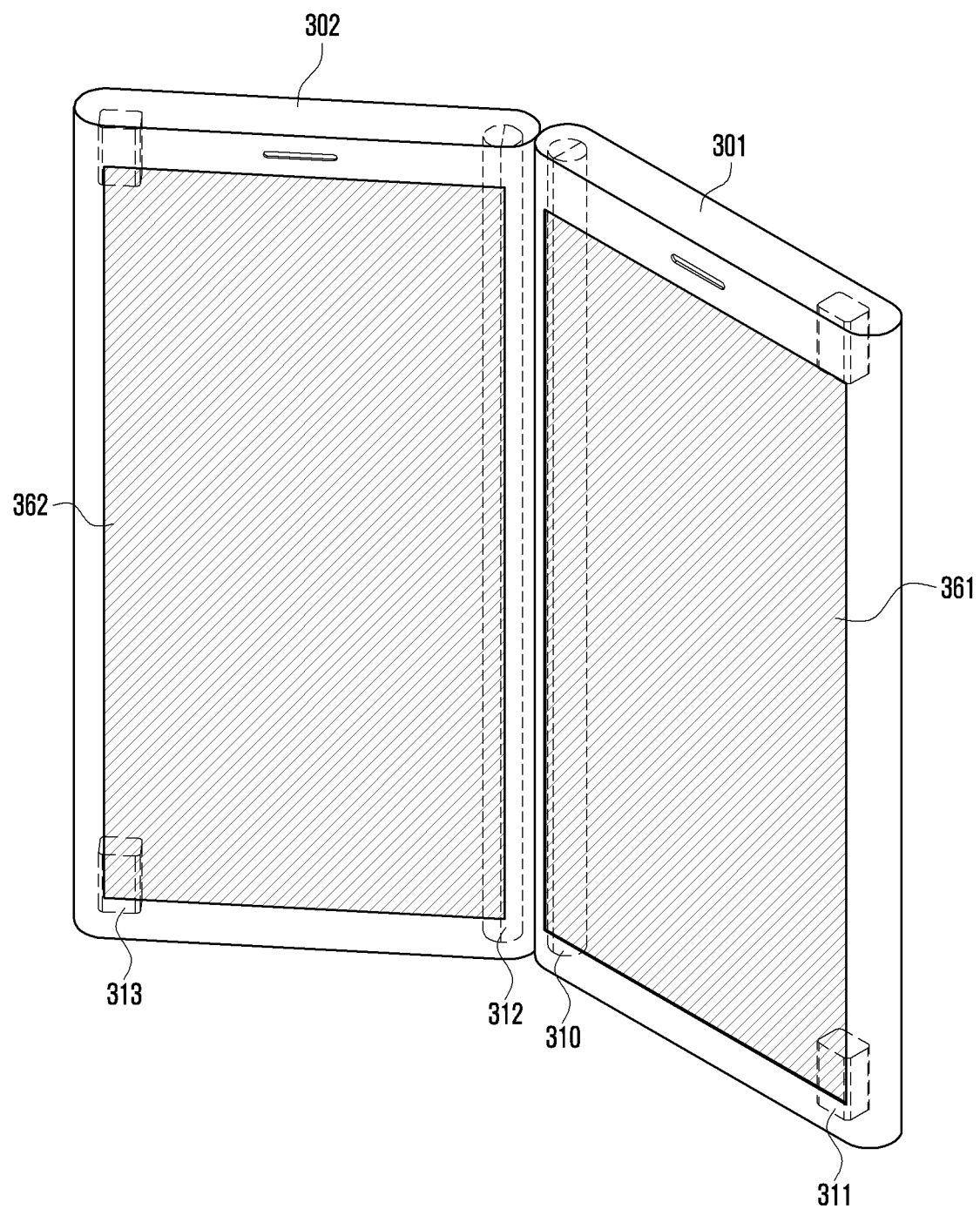

Referring to FIG. 3F, when the first display 361 and the second display 362 face the same general direction and the first housing 301 and the second housing 302 are attached in a coupling angle of 90° or more, magnetic attraction between the first cylindrical magnet 310 of the first housing 301 and the second cylindrical magnet 312 of the second housing 302 may operate as a relatively larger force than a force of gravity to maintain a magnetic coupling form.

When an electronic device uses one or both the first display 361 and the second display 362 in a coupled form, the electronic device can control a screen output.

The first cylindrical magnet 310 and the second cylindrical magnet 302 included in the first housing 301 and the second housing 302, respectively may be a single cylindrical magnet as a size corresponding to a housing length, direction, or vertical direction. The first cylindrical magnet 310 and the second cylindrical magnet 302 may be a plurality of cylindrical magnets divided into a predetermined size may be disposed based on a size corresponding to a housing length direction or vertical direction. A plurality of cylindrical magnets each may further include a coupling portion coupled to rotate by a single shaft or may have a form in which a plurality of cylindrical magnets are coupled with the same polarity. The plurality of cylindrical magnets may be disposed in a single line at one side end of the first housing 301 and the second housing 302 or may be implemented in a form that can be rotated to be rearranged by attraction of a pole opposite to that of the approaching other magnet.

Alternatively, in order to prevent the first housing 301 and the second housing 302 from being coupled in an alternate form by a repulsive force of the magnet, the first housing 301 and the second housing 302 or an odd-numbered cylindrical magnet may be implemented.

Figure 4A:
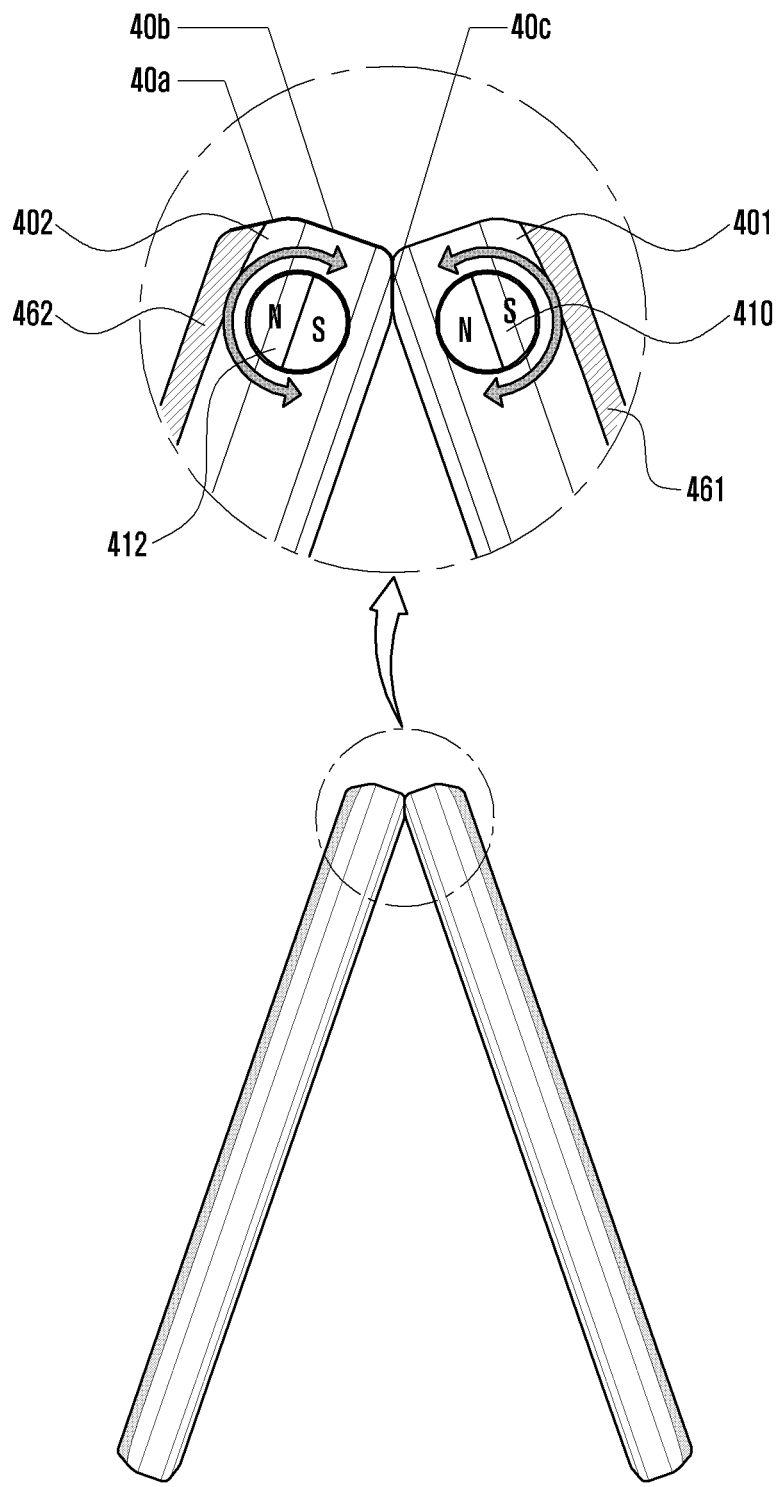
FIGS. 4A to 4C illustrate a magnetic coupling structure of two display devices according to an embodiment.
Figure 4B:
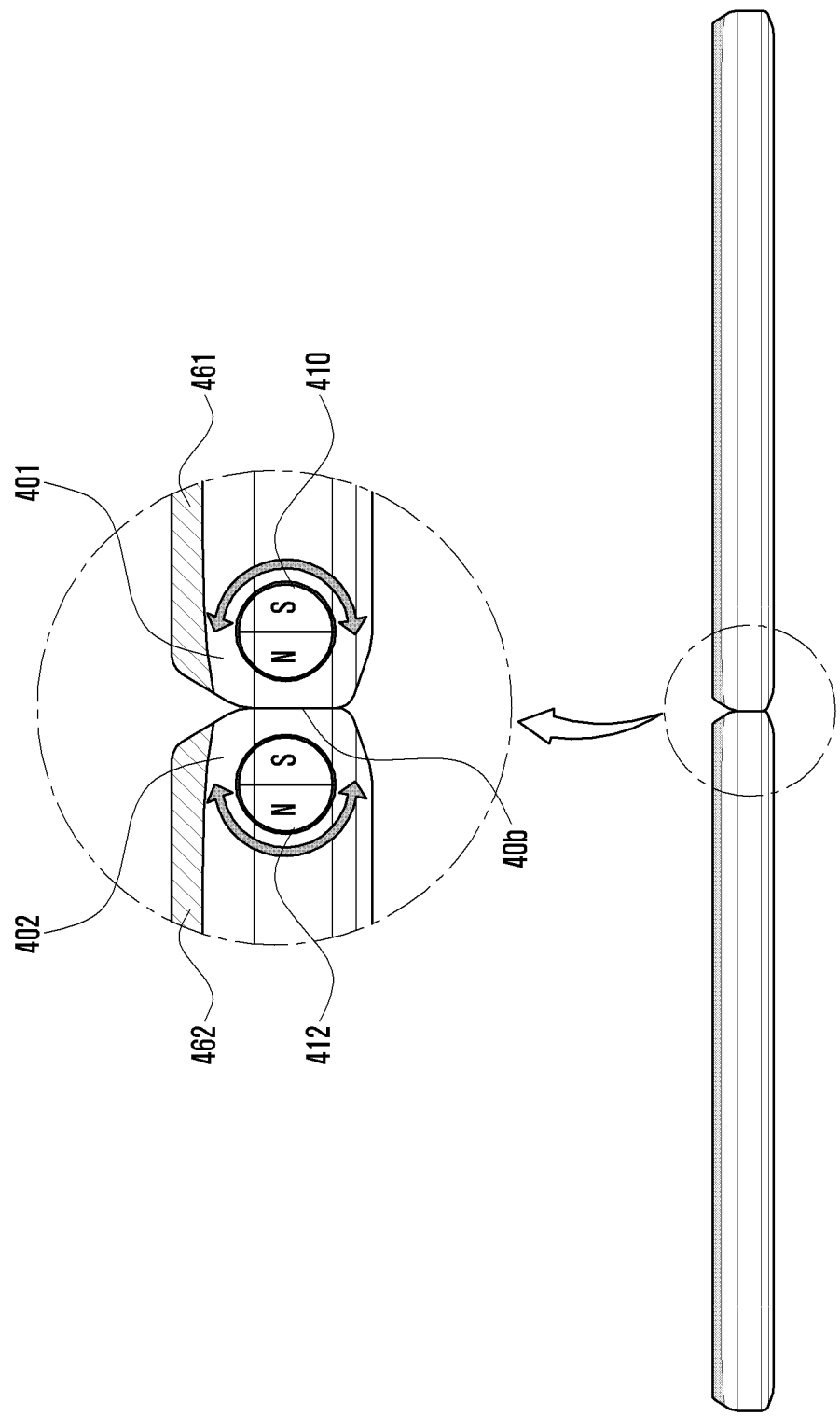
Figure 4C:
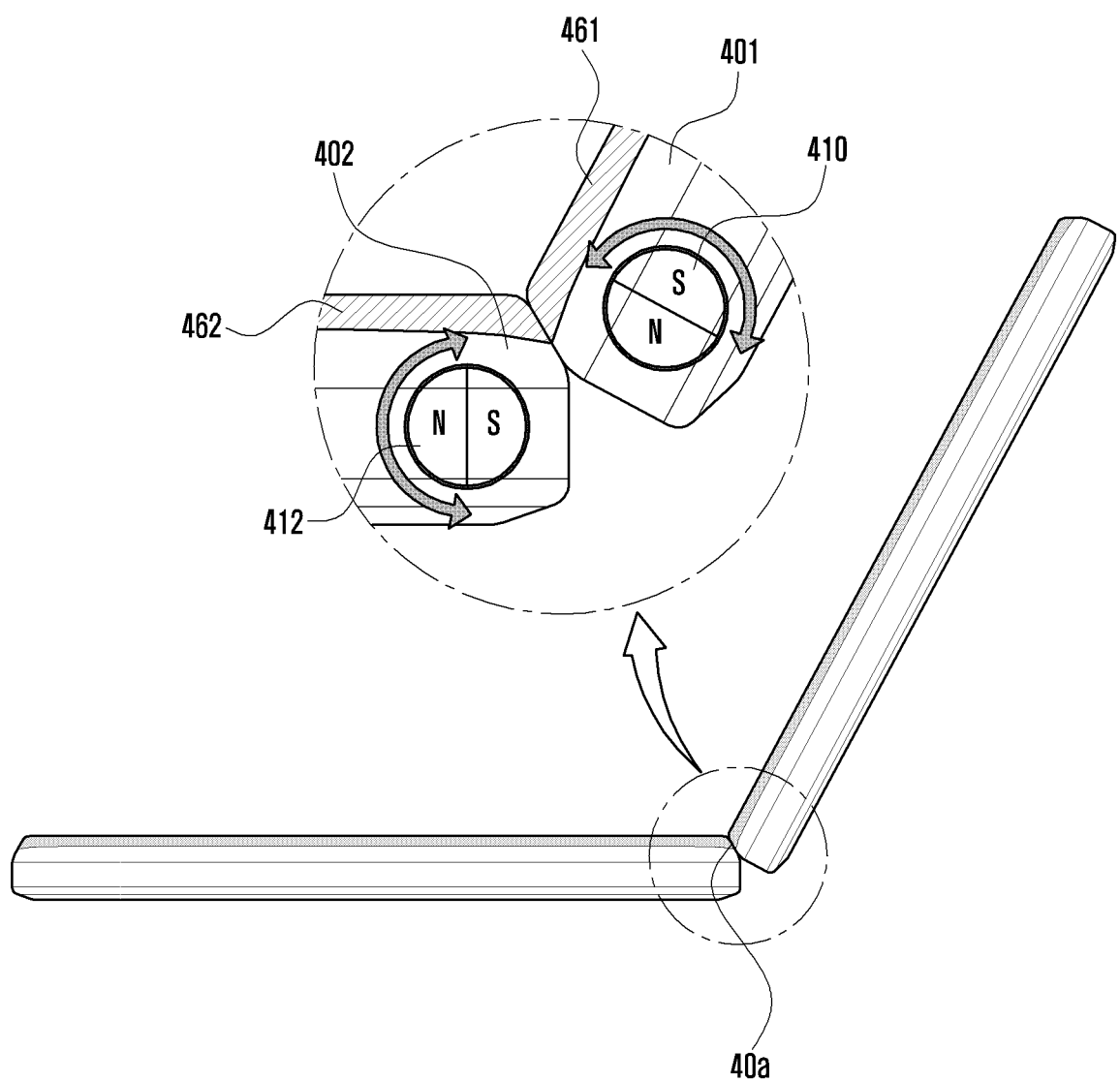

FIGS. 4A to 4C illustrate a magnetic coupling structure of two display devices according to an embodiment.

Referring to FIGS. 4A to 4C, coupling sides of a first housing 401 including a first display 461 and a second housing 402 including a second display 462 are each configured to have three surfaces that are cut in predetermined angles.

For example, in order to improve a magnetic coupling force of cylindrical magnets 410 and 412, side edges of the first housing 401 and the second housing 402 may have an end surface of at least three surfaces. When the side edges are produced in an end surface 40a of a first angle, an end surface 40b of a second angle, and an end surface 40c of a third angle, as illustrated in FIG. 4A, the first display 461 and the second display 462 of the first housing 401 and the second housing 402 may be exposed in an outward direction and be magnetically coupled at the end surfaces 40c of the third angle. Therefore, a first cylindrical magnet 410 and a second cylindrical magnet 412 may be rotated to be rearranged with maximum attraction of opposite poles in a contact direction of the end surfaces 40c of a third angle. Cutting the end surface of the side edge increases a frictional force of contact surfaces, other than magnetic attraction, in order to improve a fixing force of magnetic coupling between the first housing 401 and the second housing 402.

Referring to FIG. 4B, the first display 461 and the second display 462 of the first housing 401 and the second housing 402 face in the same direction, and the end surfaces 40b of the second angle are coupled in a contact form at the side surfaces of the first housing 401 and the second housing 402. Accordingly, the first cylindrical magnet 410 and the second cylindrical magnet 412 rotate in a direction of the end surface 40b of the second angle, and thus a shaft of magnetic attraction may be changed.

Referring to FIG. 4C, the first display 461 and the second display 462 of the first housing 401 and the second housing 402 face in the same direction, and the first end surfaces 40a are magnetically coupled in contact form. Because the first end surfaces 40a of the first housing 401 and the second housing 402 are coupled in contact form, the first cylindrical magnet 410 and the second cylindrical magnet 412 rotate in a contact direction of the first end surfaces 40a to magnetically couple the first housing 401 and the second housing 402. A contact friction force of the first end surface 40a between the first housing 401 and the second housing 402 increases a force of magnetic attraction of the first cylindrical magnet 410 and the second cylindrical magnet 412 to be larger than a force of gravity and a weight of the first housing 401, thereby improving a fixing force of magnetic coupling between the first housing 401 and the second housing 402.

Although FIGS. 4A to 4C illustrate the side edges cut at three different angles, the side edges of the present disclosure is not limited to this specific shape.

For example, although not illustrated in FIGS. 4A to 4C, a side edge in which the first housing 401 and the second housing 402 couple may be formed in a sawtooth shape in addition to an end surface form having an angle. Because an outer shape of the side surfaces of cylindrical magnets disposed at each of the first housing and the second housing is formed in a sawtooth shape of an engaging form, a fixing force of magnetic coupling that couples and supports the first housing 401 and the second housing 402 in a predetermined angle can be improved.

Figure 5A:
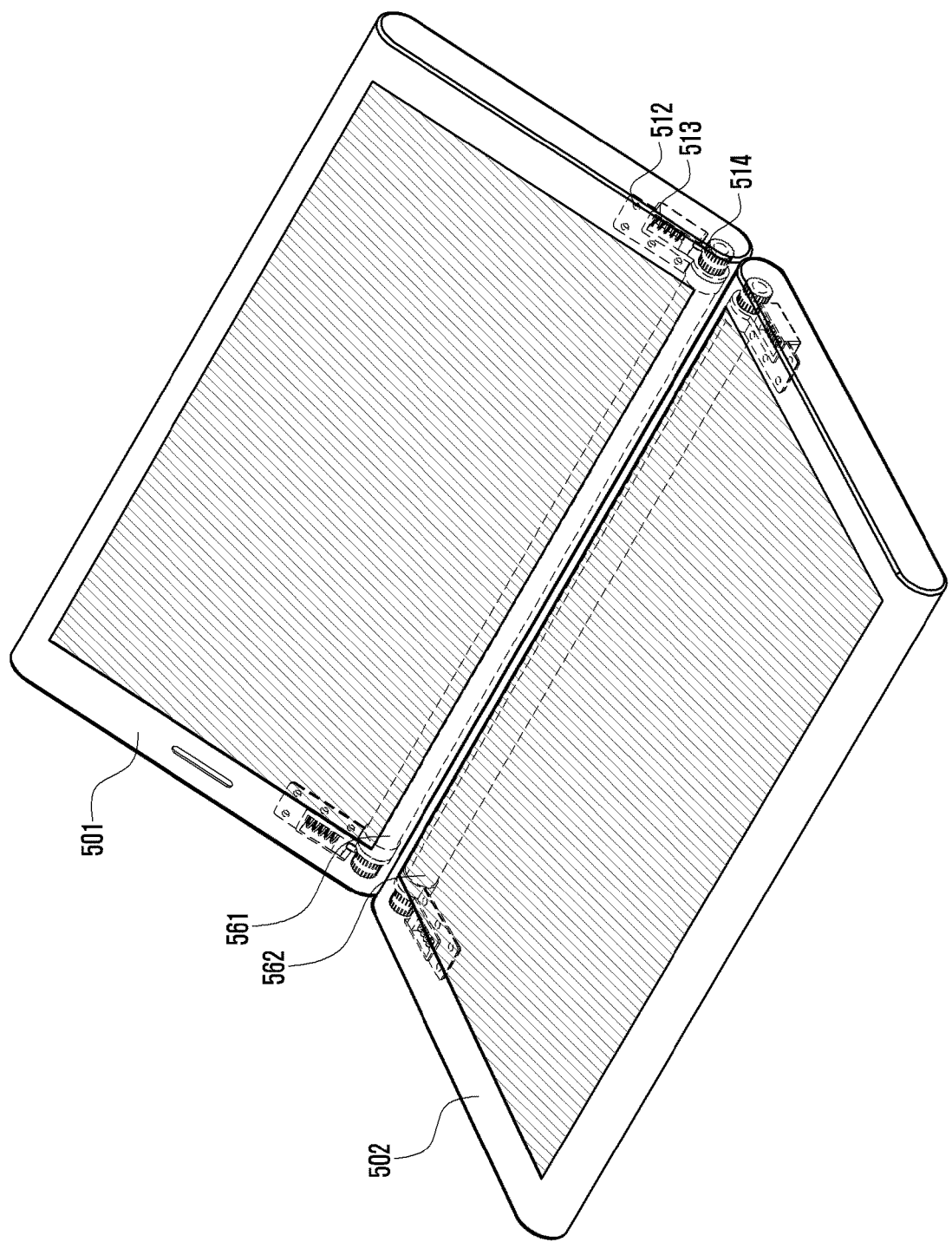
FIGS. 5A and 5B illustrate a magnetic coupling structure of two display devices according to an embodiment.
Figure 5B:
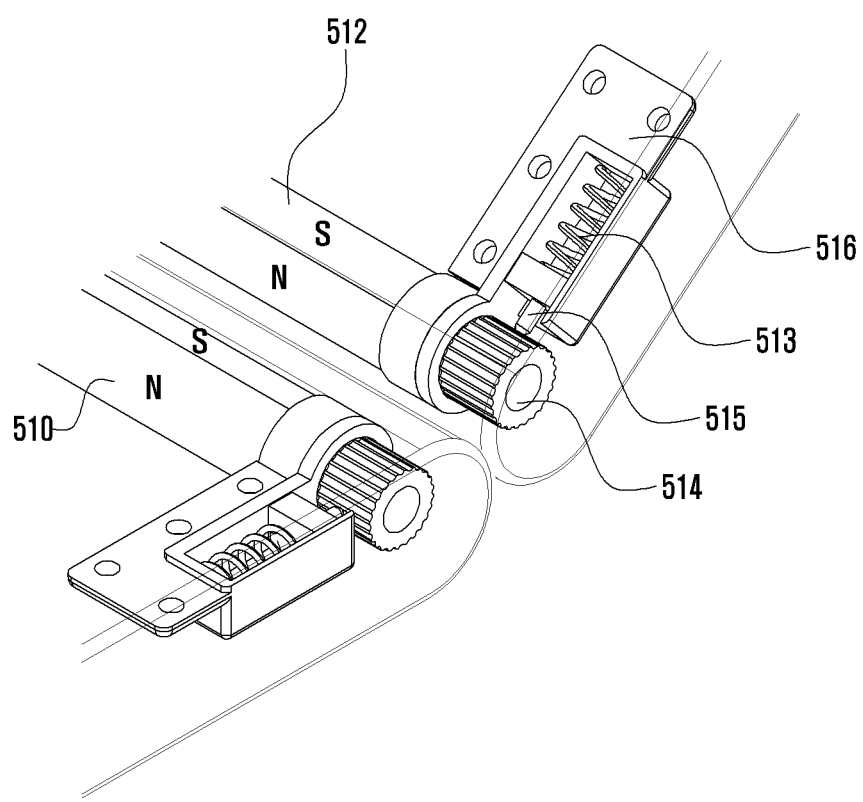

FIGS. 5A and 5B illustrate a magnetic coupling structure of two display devices according to an embodiment.

Referring to FIGS. 5A and 5B, a first housing 501 including a first display 561 and a second housing 502 including a second display 562 include a hinge portion 514 for rotatably supporting respective cylindrical magnets 512 and 510 therein.

A first cylindrical magnet 512 disposed within the first housing 501 includes a hinge portion 514 configured to have a plurality of grooves in a sawtooth shape, a protruding portion 515 configured to support the first cylindrical magnet 512 by coupling to the hinge portion 514 and protruded in an engagement form with any one groove of a plurality of grooves included in the hinge portion 514, a spring 513 configured to adjust elasticity of the protruding portion 515 by curvature of the groove, and an angle adjustment portion 516 configured to adjust a shaft angle of magnetic coupling between the first cylindrical magnet 512 and the second cylindrical magnet 510 by coupling of the hinge portion 514, the protruding portion 515, and the groove.

For example, the hinge portion 514 and the angle adjustment portion 516 may be formed in a connected form and may include a cylindrical fixing member (not shown) for connecting and fixing in a separated form. The angle adjustment portion 516 may be fixed to the first housing 501, and the hinge portion 514 of a sawtooth shape may be rotatably coupled to the angle adjustment portion 516. When the first cylindrical magnet 512 is adjacent to the second cylindrical magnet 510 and when the first housing 501 and the second housing 502 are disposed at a position having a predetermined angle, the cylindrical magnets 510 and 512 rotate by magnetic attraction to change a shaft direction thereof. Because the hinge portion 514 of a sawtooth form rotates according to a shaft rotation of the magnet, the protruding portion 515 fastened to any one of the grooves of the hinge portion 514 temporarily generates elasticity by the spring 513 to be fastened to the next groove. For example, when the hinge portion 514 rotates, the protruding portion 515 is elastically changed by elasticity of the spring 513, and a position of the fastened groove may be changed.

Alternatively, the hinge portion may be formed in an internal ball bearing form. For example, the hinge portion may include a plurality of separation prevention protrusions and depressions at an inside of a hole therein and bearings connected to the cylindrical magnet to support rotatably a rotation shaft of the cylindrical magnet, and a fixing force of magnetic coupling can be improved by coupling of the bearings and the separation prevention protrusions and depressions while rotating by the rotation shaft. Accordingly, even if a coupling angle of the first housing 401 and the second housing 402 is changed in a desired shape, under a user intention, the magnetic shaft is changed to rotate by maximum magnetic attraction within the first housing 401 and the second housing 402, and by fixing the changed rotation shaft by the hinge portion, a fixing force of magnetic coupling can be improved.

An electronic device according to an embodiment of the present disclosure may control a screen output using one or both the first displays 361, 461, and 561 and the second displays 362, 462, and 562 according to a coupled form of the first housings 301, 401, and 501 and the second housings 302, 402, and 502, respectively.

Figure 6:
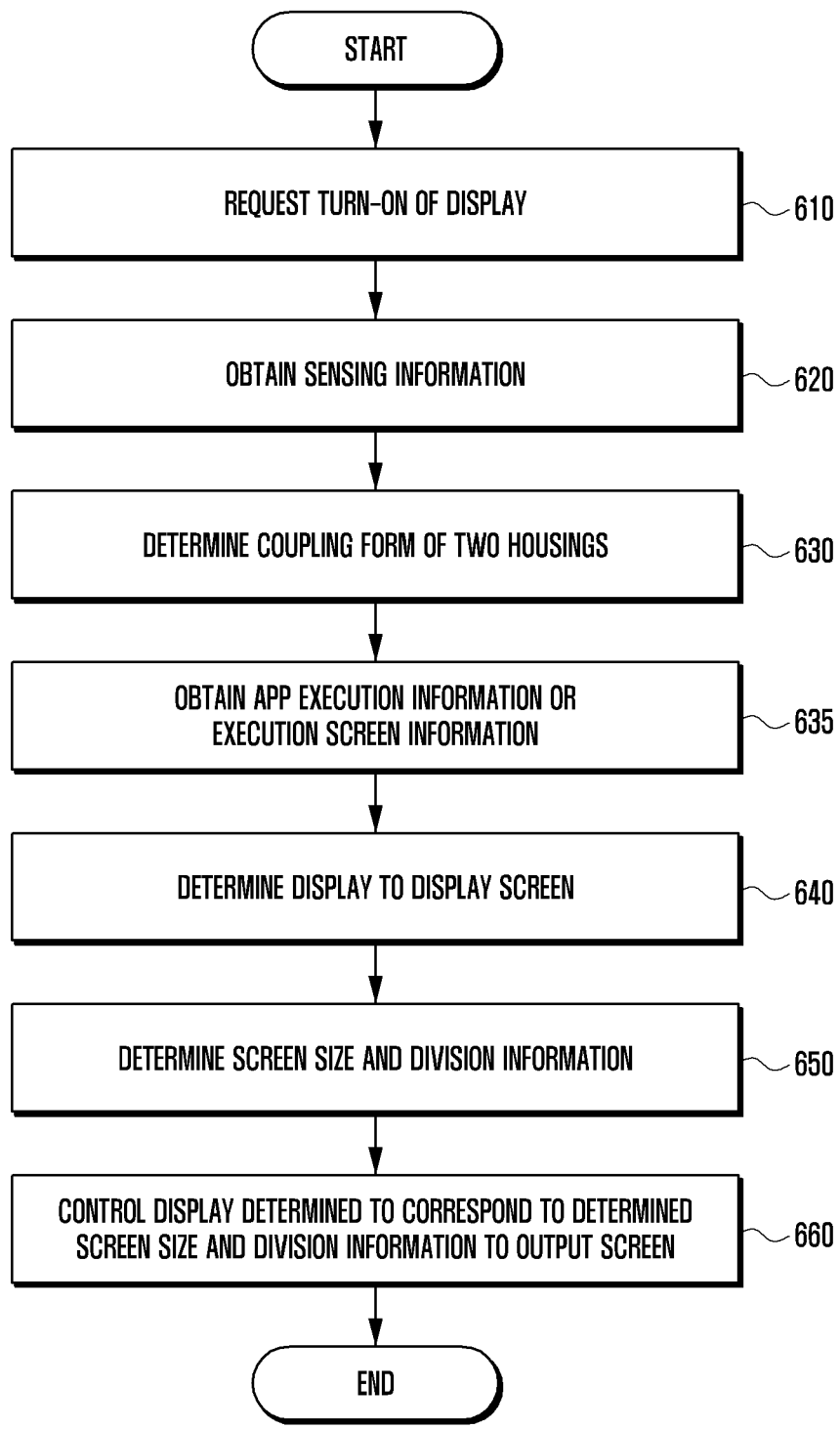
FIG. 6 is a flowchart illustrating a method of operating a screen of an electronic device with two detachable displays, by magnetism, according to an embodiment.

An electronic device according to an embodiment of the present disclosure may execute at least a partial configuration or function of the first housings 301, 401, and 501 and the second housings 302, 402, and 502, according to a coupled form of the first housings 301, 401, and 501 and the second housings 302, 402, and 502, respectively. FIG. 6 is a flowchart illustrating a method of operating a screen of an electronic device in which two displays are attached by magnetism according to an embodiment.

Referring to FIG. 6, a processor 120 of an electronic device 101 selects at least one of a first display and a second display, based on at least one of a coupled form of a first housing and a second housing, a disposition direction, executed application information, and execution screen information of the first display and the second display, and controls the selected display to output a screen according to the coupled form of the first housing and the second housing. The processor may be mounted in one or both of the first housing and the second housing. For example, when a plurality of processors exist, one processor may communicate with other processors through the wireless communication unit, thereby comprehensively controlling components included within each housing.

At step 610, at least one processor receives an event that requests to turn-on a display. For example, the processor may receive an input event that requests to turn-on the display. The input event may be received from the user through a touch input, a button input, or a voice input. Alternatively, the processor may receive notification information to detect an occurrence of a notification event that outputs the notification information to the display.

At step 620, the processor obtains sensing information from a sensor module in response to the turn-on request of the display. The sensor module mounted in the first housing and/or the second housing may include at least one of a sensor, a gyro sensor, a geomagnetic sensor, a gravity sensor, a motion sensor, an inclination sensor, a brightness sensor, an altitude sensor, a smell sensor, a temperature sensor, a depth sensor, a pressure sensor, a bending sensor, an audio sensor, a video sensor, a GPS sensor, and a touch sensor.

At step 630, the processor determines a coupled form by attraction of cylindrical magnets mounted in each of the first housing and the second housing, based on sensing information obtained from the sensor module.

The processor may determine the coupled form of the first housing and the second housing, a position direction of the first display positioned at the first housing and the second display positioned at the second housing, and a display position that recognizes the user through sensing information.

At step 635, the processor obtains execution screen information or application execution information to output to the display. For example, the user may request execution of a specific application or may input a screen change request of the executed application through the input module.

At step 640, the processor determines a display to display information according to a determined coupled form of the displays and determines division information and a size of a screen for outputting information in the operation.

For example, as illustrated in FIG. 3A, when side surfaces of the first housing and the second housing contact with each other and the first display 361 and the second display 362 face in the same direction, the processor may recognize the coupled form of the first housing 361 and the second housing 362. Because the first display 361 and the second display 362 are face the same direction, e.g., a direction facing the user, the processor may determine both the first display 361 and the second display 362 to display information, and may determine at least one of a configuration and a size of a screen to be output to each of the first display and the second display and division information.

At step 650, the processor controls to output a screen in at least one display determined based on at least one of the determined screen configuration, screen size, and division information.

For example, when the user requests movie reproduction, if two housings are in a magnetic coupled form as illustrated in FIG. 3A, the processor may divide screen output information of movie reproduction to control to output the screen output information in both the first display 361 and the second display 362. Accordingly, the electronic device may provide a visual effect of viewing the movie on a larger screen by simultaneously using the first display 361 and the second display 362 as one screen.

The processor mounted in any one of the first housing and the second housing may perform the above-described operations and perform wireless communication through a wireless communication module included in each of the first housing and the second housing in order to transmit and receive a screen control command of the display and data of screen information. For example, the processors for controlling the first display and the second display may independently operate in each of the first housing and the second housing, and a main processor mounted in any one of the first housing and the second housing may operate to transfer a control command of the display to each display driver IC for controlling the display.

Figure 7:
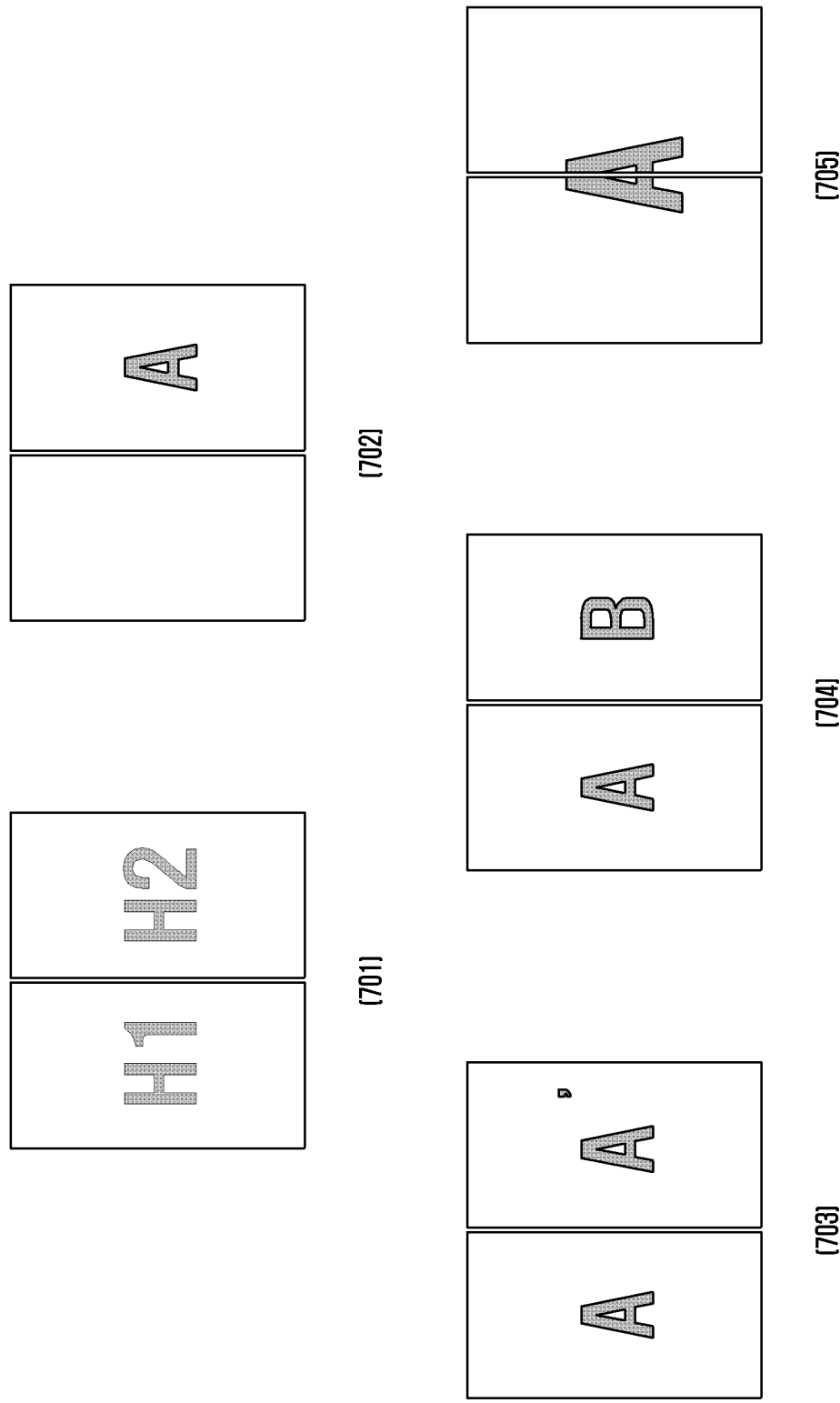
FIG. 7 illustrates screen formats of two displays, coupled by magnetism, according to an embodiment.

FIG. 7 illustrates screen formats of two displays, coupled by magnetism, according to an embodiment.

Referring to FIG. 7, an electronic device may determine a coupled form by magnetic attraction between two housings, adjust a screen size, and divide a screen according to the coupled form in order to output at least one of a first display and a second display.

As shown in screen format 701, when outputting a home screen in the display, an electronic device may display a home screen of a first page in a first display and display a home screen of a second page in a second display. When a page change input is detected by the user, the electronic device may display a home screen of a third page in the first display and/or to display a home screen of a fourth page in the second display.

As shown in screen format 702, the electronic device may select only one of a first display and a second in order to display information according to the coupled form and output an execution screen on only the selected display.

As shown in FIG. 3C, when only one of the first display and the second display is positioned in a direction facing the user, the electronic device may control to display an execution screen in only the display facing the user, e.g., the second display 362.

As shown in screen format 703, when an event to output information derived from an execution screen is detected while outputting an execution screen in only the first display, the electronic device output derived information, e.g., a secondary screen in the second display. For example, when the user requests a search for a specific keyword through a web page screen output on the first display, the processor output a search screen of the results for a specific keyword on the second display.

As shown in screen format 704, the electronic device may output different screens on the first display and the second display. For example, the electronic device may output a first app execution screen on the first display and output a second app execution screen on the second display.

As shown in screen format 705, the electronic device may divide screen information for display as a single image on both the first display and the second display. For example, the electronic device may divide screen output information of movie reproduction to output the screen output information in both the first display and the second display.

Figure 8:
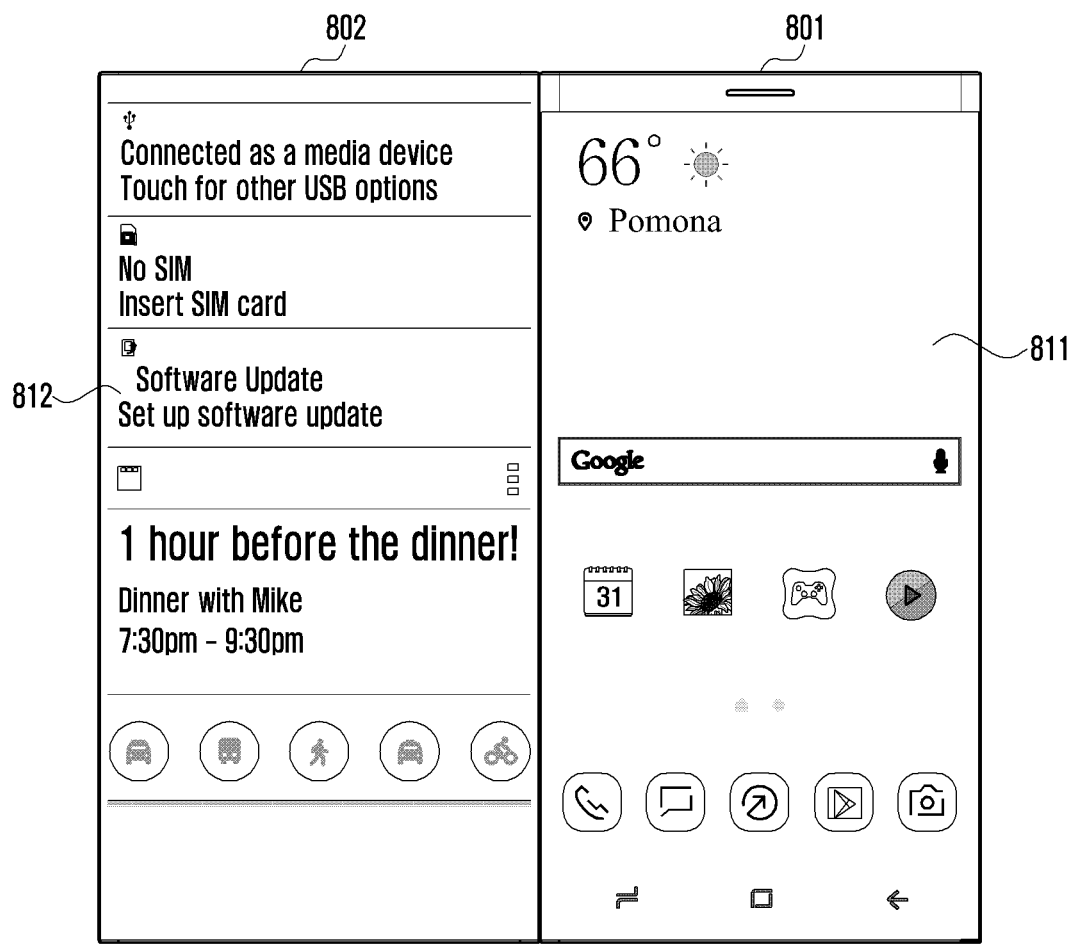
FIGS. 8 and 9 illustrate screen displays in which a user experience (UX) interface is displayed on an electronic device according to an embodiment.
Figure 9:
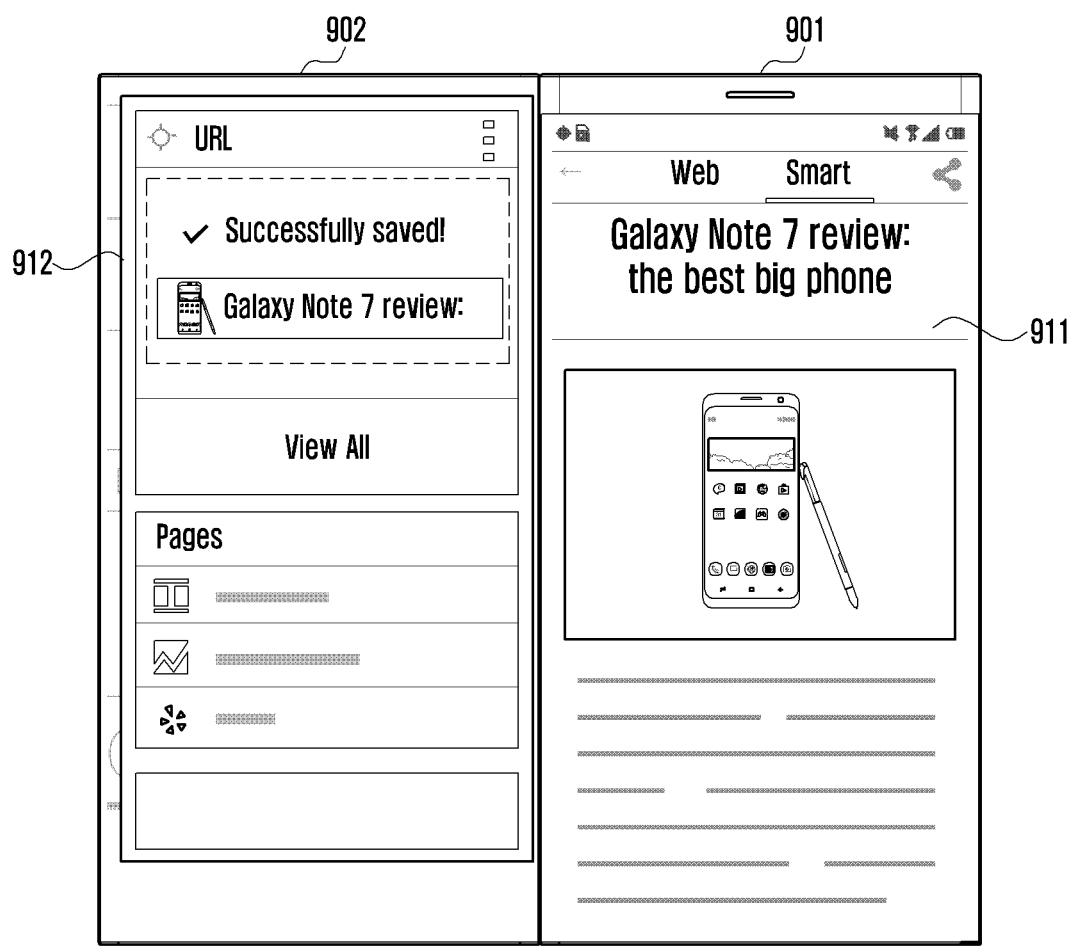

FIGS. 8 and 9 illustrate screen displays in which a UX interface is displayed on an electronic device according to an embodiment.

Referring to FIG. 8, by cooperating a first display and a second display according to a coupled state of a first housing 801 and a second housing 802, a processor of an electronic device may simultaneously output a first screen and a second screen or output a second screen derived from a first screen.

In order for two displays to face the user, the user may change a magnetic coupling form of the first housing 801 and the second housing 802 and perform a request input that turns on the display. The processor of the electronic device may output screens in both the first display and the second display in response to the request input that turns on the display.

For example, the processor of the electronic device may display a home screen 811 in the first display of the first housing 801 and display a secondary screen 812 in the second display of the second housing 802. Here, the secondary screen may include at least one of notification information that provides notification information to a user, news information, use information of a housing that analyzes and provides a user's life pattern, frequently used app information, and user setting information.

For example, the processor of the electronic device may output an execution screen in both the first display and the second display in a coupled state in which a first display and a second display are contacted at respective side surfaces, e.g., as illustrated in FIGS. 3A, 3E, and 3F, or may output one screen, i.e., a screen using one display of the first display and the second display in an out folding state in which the displays are exposed on opposite sides of the coupled device, as illustrated in FIG. 3C.

Referring to FIG. 9, the user may use a first app execution screen 911 output on the first display of the first housing 901. For example, when the first app execution screen 911 is a web page, the user may request a search for a specific keyword of the web page. The processor of the electronic device may determine a magnetic coupling form in which the first display and the second display are exposed in the same direction and contacted at side surfaces thereof, and output a search result screen 912 for a search keyword in the second display of the second housing 902.

When the user surfs a web page through the first display, the user may receive information about advertisement pop-up derived from a currently output web page.

Therefore, the processor of the electronic device may determine a magnetic coupling form in which the first display and the second display are exposed in the same direction and contacted at side surfaces thereof, and output an advertisement pop-up screen on the second display.

Figure 10:
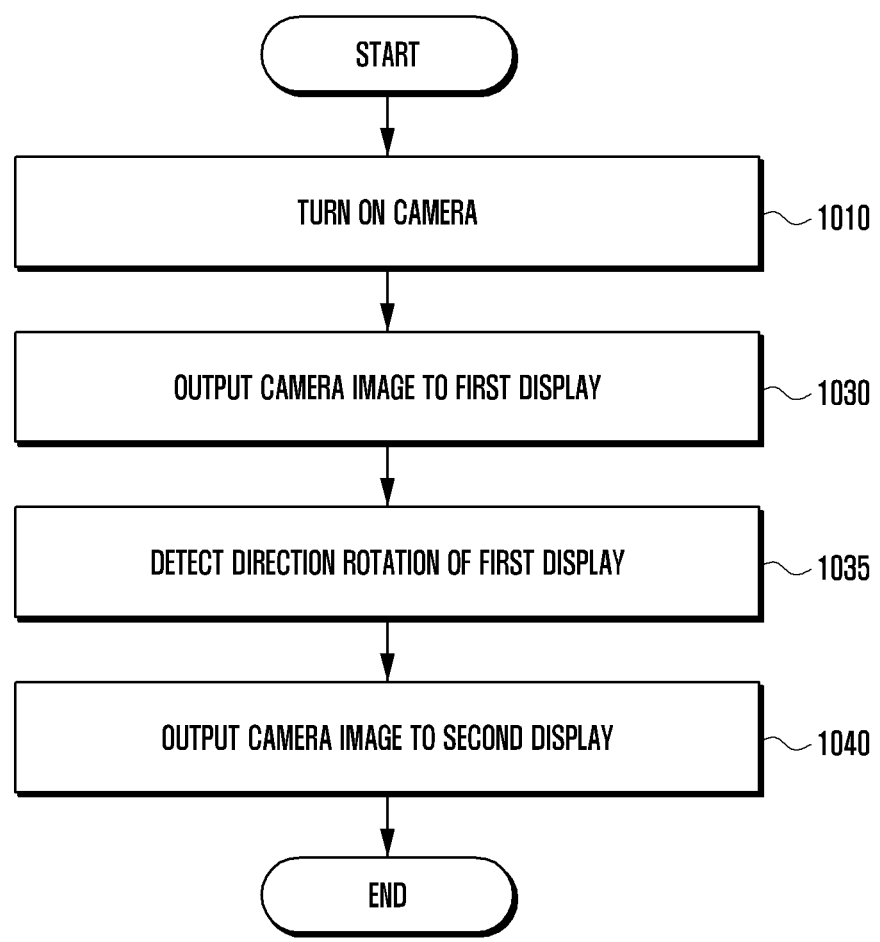
FIG. 10 is a flowchart illustrating a method of operating two displays coupled by magnetism according to an embodiment.

FIG. 10 is a flowchart illustrating a method of operating a screen of two displays coupled by magnetism according to an embodiment.

Referring to FIG. 10, at step 1010, at least one processor detects an input that requests camera-on. For example, when the processor receives a user input (e.g., a touch or voice input) that requests camera app execution or receives a change signal that changes from a magnetic coupling form in which the first display and the second display are opposite to each other and are exposed to the outside to a coupling form that slides to expose a portion of rear surfaces of the first housing and the second housing, the processor may detect an input that requests camera-on.

At step 1030, the processor outputs a camera image obtained from the camera module (e.g., the image sensor 180).

The processor may enter a camera mode and output a camera image to the first display in response to the change signal that changes from a magnetically coupled form in which the first display and the second display are opposite to each other and are both exposed to a coupled form in which a portion of the rear surfaces of the first housing and the second housing are exposed, but the present disclosure is not limited thereto and the processor may output a camera image obtained from the camera module to the second display opposite to the first display.

For example, when the user wants to take a picture of a person, the user may view an image of person through a camera image output on the first display and the person may view their image through the camera image output on the second display.

At step 1035, the processor detects a change in a disposition direction of the first display and the second display, e.g., a direction rotation.

At step 1040, the processor outputs a camera image on the second display in response to the change in the disposition direction of the first display.

Alternatively, the processor may detect that a magnetically coupled form of the first housing and the second housing has been changed or may detect a movement in which a disposition direction of the first display is rotated such that the camera sensor faces the user.

Figure 11:
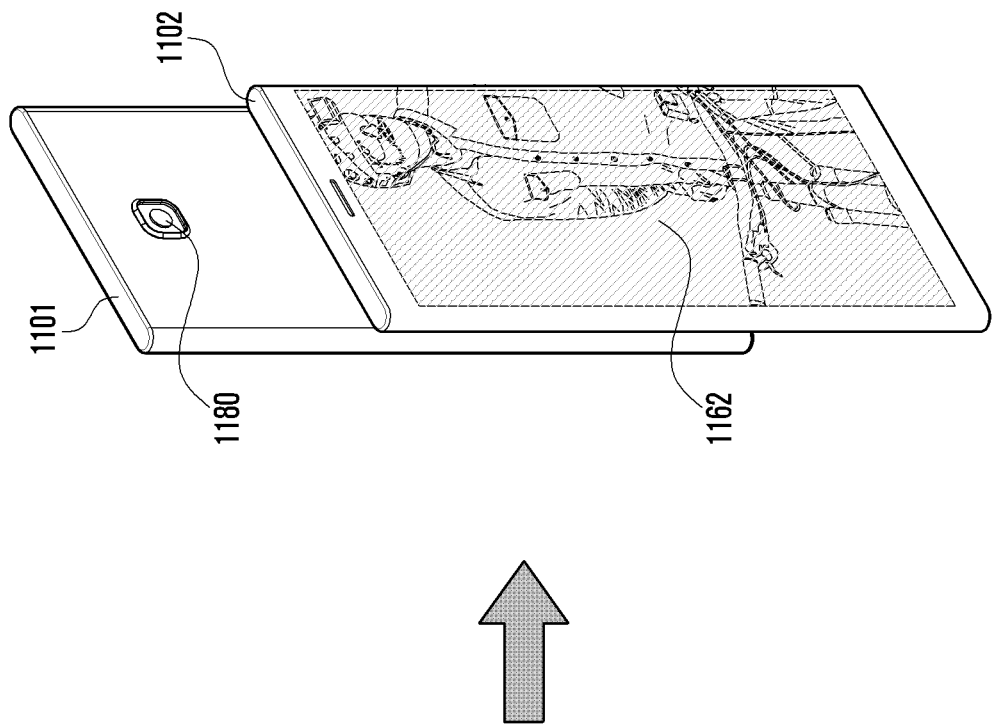
FIG. 11 illustrates a method of operating a screen of an electronic device including two attachable/detachable displays, by magnetism, according to an embodiment.
Figure 11:
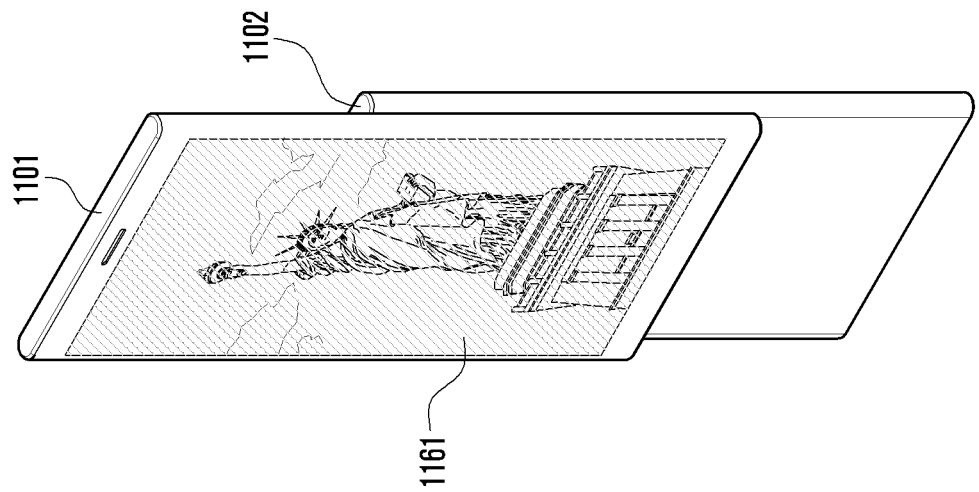

FIG. 11 illustrates a method of operating a screen of an electronic device including two displays, attached by magnetism, according to an embodiment.

Referring to FIG. 11, a user may change from a magnetically coupled form in which a first display 1161 and a second display 1162 are even folder on each other by sliding a first housing 1101 and a second housing 1102 to expose a portion of the rear surfaces of the first housing 1101 and the second housing 1102.

When a change signal is detected by sliding the first housing 1101 and the second housing 1102 to expose the portion of rear surfaces of the first housing 1101 and the second housing 1102, the electronic device may enter a camera execution mode and output a camera image obtained from a camera module 1180 to the first display 1161.

The electronic device may simultaneously output a camera image obtained from the camera module to the first display and the second display.

Thereafter, the user may rotate a display direction of the first housing 1101 and the second housing 102 such that the second display 1162 and the camera module 1180 face the user in a coupling form that slides to expose a portion of rear surfaces of the first housing 1101 and the second housing 102.

The electronic device may output a camera image obtained from the camera module 1180 on the second display 1162. For example, the camera module 1180 may obtain a user image, and the user may determine the user's selfie image through the second display 1162 facing the user.

Figure 12:
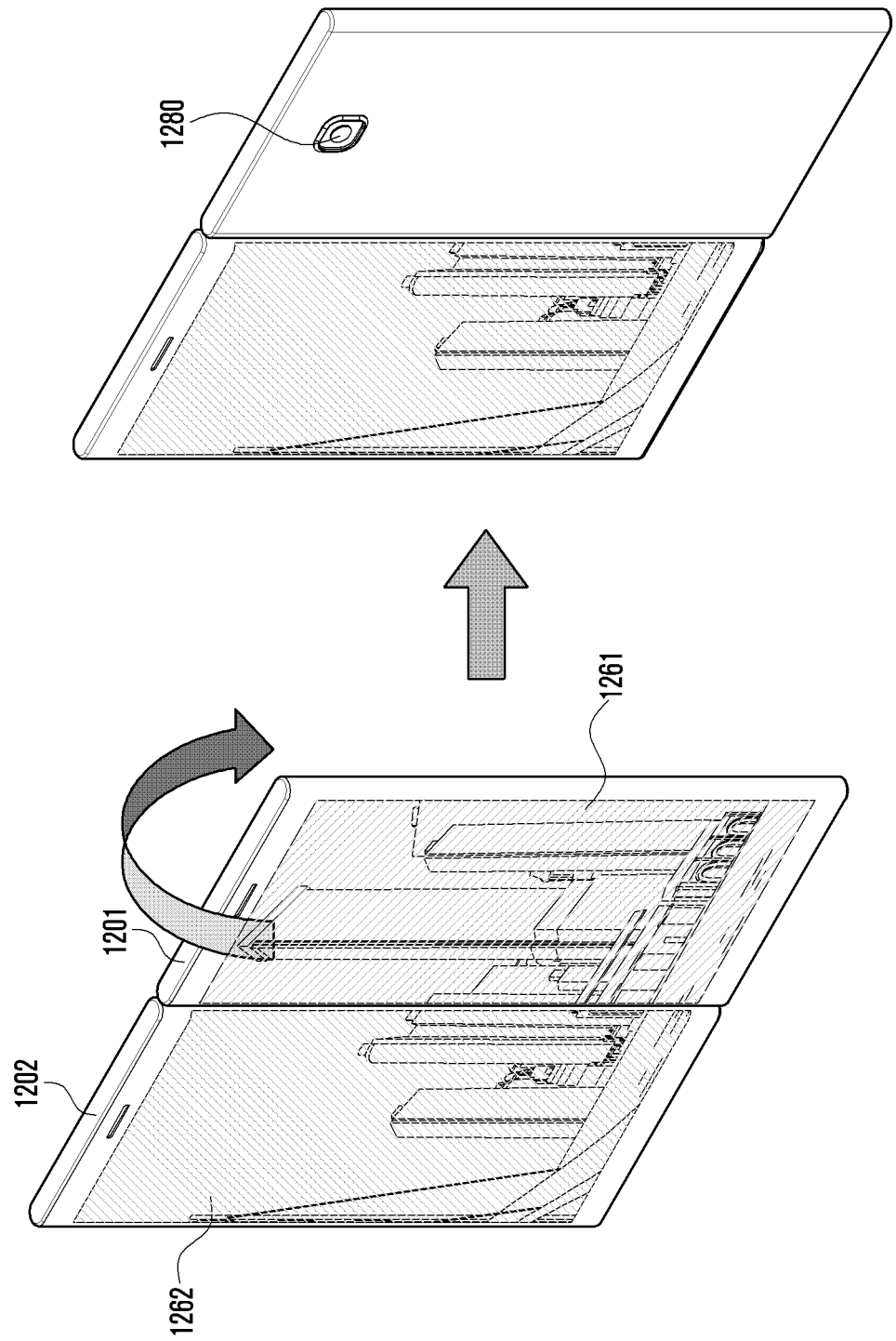
FIG. 12 illustrates a method of operating a screen of an electronic device including two attachable/detachable displays, by magnetism, according to an embodiment.

FIG. 12 illustrates a method of operating a screen of an electronic device including two displays, attached by magnetism, according to an embodiment.

Referring to FIG. 12, a user may operate the electronic device in a form in which a first display 1261 and a second display 1262 are exposed in the same direction and in which a first housing 1201 and a second housing 1202 are magnetically coupled at the side surfaces thereof. Accordingly, the electronic device may output a large screen through the first display 1261 and the second display 1262.

Thereafter, if the user wants to take a selfie, the user may flip the first housing 1201 to change to the magnetically coupled form, such that the first display 1261 is opposite to the second display 1262 and a camera module 1280 faces the user in the same direction as the second display 1262.

Therefore, the electronic device may recognize that a disposition position of the first display 1261 has been changed by a rotation and control to output the user's camera image obtained through the camera module to the second display 1262.

Figure 13:
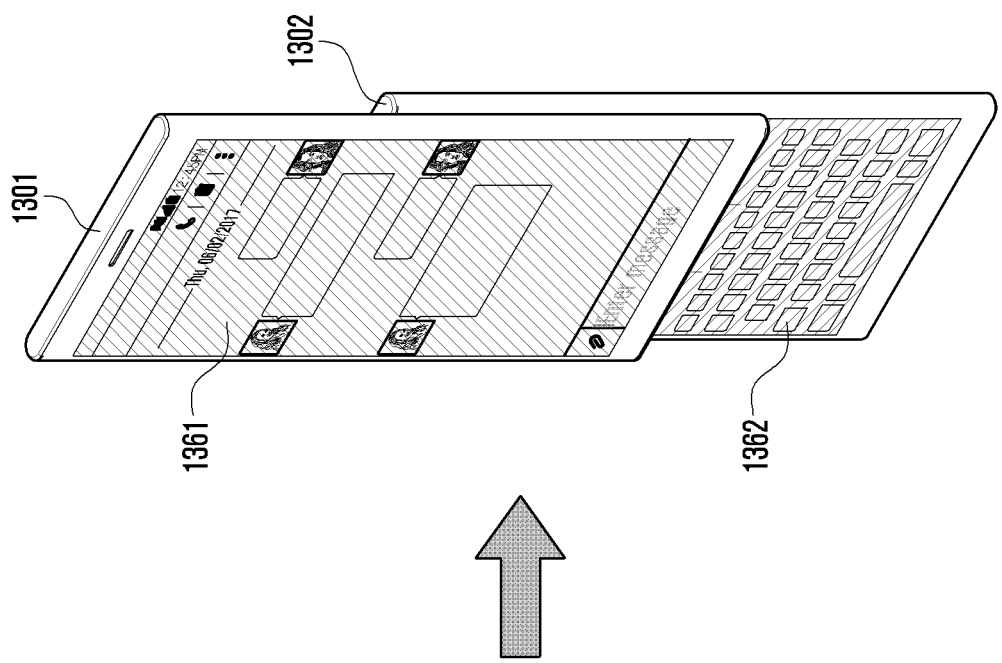
FIG. 13 illustrates a method of operating a screen of an electronic device including two attachable/detachable displays, by magnetism, according to an embodiment.
Figure 13:
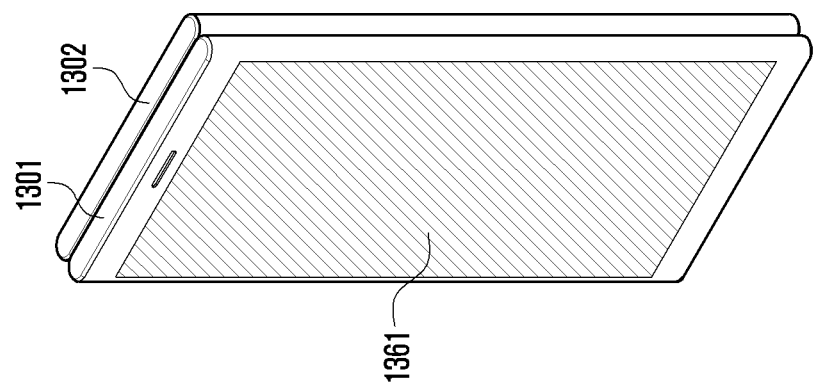

FIG. 13 illustrates a method of operating a screen of an electronic device including two displays, attached by magnetism, according to an embodiment.

Referring to FIG. 13, in a first magnetically coupled form, a first display 1361 and a second display 1362 are disposed in the same direction, such that a rear surface of a first housing 1301 covers a front surface of a second housing 1302.

If the user wants to display a message writing screen or a text input screen, the user may slide the first housing 1301 upward to expose a portion of the second display 1362 of the second housing 1302.

The electronic device may detect the sliding operation and output a text input screen or a document input screen. The electronic device may detect a size of portion of the second display 1362 exposed to the outside and control to output a touch key pad screen for a touch input to the second display 1362 to correspond to the exposed size.

According to an embodiment of the present disclosure, an electronic device having two displays includes cylindrical magnets that can rotate to change shaft directions of the magnets at side surfaces thereof, and couple the two displays in various angles by rotating shafts of the magnets by magnetic attraction of an adjacent magnet.

The electronic device can determine a coupled form of two displays, coupled by magnetic attraction, select at least one of the two displays to display a screen according to the coupled form and screen output information, and output an optimal screen in the selected display.

Accordingly, a user can change output information of a screen by changing a coupled form of two displays, and thus, the user's UX experience convenience and usability of electronic devices can be improved.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor 120 of the machine may invoke at least one of the one or more instructions stored in the storage medium, and execute it, with or without using one or more other components under the control of the processor.

Accordingly, the machine may be operated to perform at least one function according to the at least one instruction invoked.

The one or more instructions may include a code generated by a complier or a code executable by an interpreter. The machine-readable storage medium may be provided in the form of a non-transitory storage medium. Herein, the term "non-transitory" means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to the above-described embodiments, each component (e.g., a module or a program) may include a single entity or multiple entities. Alternatively, one or more of the above-described components may be omitted, or one or more other components may be added.

Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration.

According to an embodiment, operations performed by a module, a program, or another component may be carried out sequentially, in parallel, repeatedly, or heuristically, or one or more of the operations may be executed in a different order or omitted, or one or more other operations may be added.

Although certain embodiments of the present disclosure have been described in detail hereinabove, it should be clearly understood that many variations and modifications of the basic inventive concepts herein described, which may appear to those skilled in the art, will still fall within the spirit and scope of the embodiments of the present disclosure as defined in the appended claims and their equivalents.

What is claimed is:

1. An electronic device, comprising:
 a first housing including:
  a first display exposed through a surface of the first housing, and
  a first wireless communication module disposed within the first housing;
  at least one first cylindrical magnet disposed in a side of the first housing; and
 a second housing separated from the first housing including:
  a second display exposed through a surface of the second housing,
  a second wireless communication module disposed within the second housing, and
  at least one second cylindrical magnet disposed in a side end of the second housing,
 wherein at least one of the first cylindrical magnet and second cylindrical magnet is configured to rotate within the first housing and the second housing, respectively, by magnetic attraction of the first cylindrical magnet and second cylindrical magnet being adjacent to each other, and
 wherein the first housing and the second housing are coupled to each other by the magnetic attraction of the first cylindrical magnet and the second cylindrical magnet;
 at least one processor included in at least one of the first housing and the second housing; and
 a memory, connected to the processor, which stores instructions that, when executed, instruct the processor to:
  determine a relative position of the first housing and the second housing;
  identify, based on determining that the first housing partially overlaps the second housing such that only a partial area of the second display is facing the same direction as the first display and a user, the second display consisting of the partial area of the second display and a remaining area of the second display, the remaining area of the second display being overlapped by the first housing; and
  transfer information associated with a screen control to the first display and the second display respectively through the first wireless communication module and the second wireless communication module; and
  display the screen on an entire area of the first display and the partial area of the second display based on the transferred information.

2. The electronic device of claim 1, wherein the instructions further instruct the processor to:
 determine execution screen information or execution information of an application; and
 divide the execution screen information or the execution information of the application to configure screen information for the selected at least one of the first display and the second display according to the relative position of the first housing and the second housing.

3. The electronic device of claim 1, wherein the instructions further instruct the processor to:
 recognize which of the first display and the second display face the user recognized through sensing information, based on the relative position of the first housing and the second housing;

display an execution screen on one of the first display and the second display facing the user, when the relative position is a first relative position in which surfaces opposite the first display and the second display of the first housing and the second housing, respectively, contact each other such that the first display and the second display face opposite directions; and display the execution screen on both of the first display and the second display facing the user, when the relative position is a second relative position in which the first housing and the second housing are coupled such that the first display and the second display face a same direction.

4. The electronic device of claim 3, wherein the instructions further instruct the processor to:
display a home screen on the first display, when the relative position is the second relative position and the execution screen is the home screen, and simultaneously display a secondary screen on the second display, the secondary screen including at least one of notification information, news information, use information of the electronic device, frequently used application information, and user setting information.

5. The electronic device of claim 3, wherein the instructions further instruct the processor to, when the relative position is the second relative position, display a first application execution screen on the first display and display a second application execution screen on the second display.

6. The electronic device of claim 3, wherein the instructions further instruct the processor to, when the relative position is the second relative position, display a first application execution screen on the first display and display an additional content providing screen related to the first application execution screen on the second display.

7. The electronic device of claim 3, further comprising:
an image sensor included in the second housing; and
a sensor configured to obtain sensor information,
wherein the instructions further instruct the processor to:
obtain an image through the image sensor:
output the image obtained through the image sensor to the first display when the relative position is the first relative position; and
output the image obtained from the image sensor to the first display, when the relative position is the second relative position and the second display is rotated such that the image sensor faces the user, based the sensor information obtained through the sensor.

8. The electronic device of claim 3, further comprising an image sensor included in at least one of the first housing and the second housing,
wherein the instructions further instruct the processor to simultaneously display an image obtained through the image sensor on the first display and the second display, in response to a received camera on request, when the relative position is the first relative position.

9. The electronic device of claim 8, wherein the camera on request comprises sliding the first housing and the second housing in order to expose the image sensor.

10. The electronic device of claim 3, wherein at least one of the first display and the second display further includes a touch panel configured to receive a touch input, and
wherein the instructions further instruct the processor to:
display a text input screen in one of the first display and the second display, in response to a received text input request, when the relative position is the first relative position; and display a keypad screen in the one of the first display and the second display that is not displaying the text input screen, in response to the coupled form changing from the first relative position to the second relative position.

11. The electronic device of claim 3, wherein the instructions further instruct the processor to power off the first display and the second display in response to detection of a third relative position in which the first display and the second display of the first housing and the second housing, respectively, are covering each other.

12. The electronic device of claim 2, further comprising:
a first processor included in the first housing; and
a second processor included in the second housing, the second processor configured to communicate with the first processor through the first wireless communication module and the second wireless communication module,
wherein the instructions further instruct the processor to control at least one of the first processor and the second processor to determine a screen control command of the first display and the second display and to transfer the determined screen control command to the other processor.

13. The electronic device of claim 1, wherein the instructions further instruct the processor to activate a component included in at least one of the first housing and the second housing, to execute a specific function in response to magnetic coupling of the first housing and the second housing, and
wherein the component included in at least one of the first housing and the second housing includes at least one of a camera, a sensor, a display, a communication module, and an audio module.

14. The electronic device of claim 1, wherein the first cylindrical magnet is configured to rotate within the first housing, and the second cylindrical magnet is configured to rotate within the second housing, and
wherein the first housing and the second housing are coupled at a predetermined angle by a rotation to change positions of shafts of magnetic attraction of the first cylindrical magnet and the second cylindrical magnet.

15. The electronic device of claim 14, wherein the first cylindrical magnet and the second cylindrical magnet each include a plurality of odd-numbered cylindrical magnets of a predetermined size in a single shaft.

16. The electronic device of claim 14, further comprising:
a hinge portion connected to both ends of each of the first cylindrical magnet and the second cylindrical magnet and having a plurality of grooves in a sawtooth shape;
a protruding portion coupled to the hinge portion to support the first cylindrical magnet and the second cylindrical magnet within the first housing and the second housing, respectively, and protruded in an engagement form with a groove of the plurality of grooves included in the hinge portion;
a spring configured to adjust elasticity of the protruding portion due to a curvature of the groove; and
an angle adjustment portion configured to adjust a shaft angle of magnetic attraction of the first cylindrical magnet and the second cylindrical magnet by coupling the hinge portion, the protruding portion, and the groove.

17. The electronic device of claim 1, wherein a side in which the first cylindrical magnet is disposed within the first housing is configured to have at least three surfaces, and a side in which the second cylindrical magnet is disposed within the second housing is configured to have at least three surfaces.

18. A method of operating a screen of an electronic device including a first housing having a first display and a first cylindrical magnet disposed on the first housing; and a second housing having a second display, separated from the first housing, and a second cylindrical magnet disposed on the second housing, wherein the first housing and the second housing are coupled to each other by magnetic attraction of the first cylindrical magnet and the second cylindrical magnet, the method comprising:

detecting a screen display request in at least one of the first display and the second display;

determining a relative position of the first housing and the second housing;

identifying, based on determining that the first housing partially overlaps the second housing such that only a partial area of the second display is facing the same direction as the first display and a user, the second display consisting of the partial area of the second display and a remaining area of the second display, the remaining area of the second display being overlapped by the first housing; and individually or simultaneously displaying a screen on an entire area of the first display and the partial area of the second display based on a screen configuration of the relative position.

* * * * *